(12) United States Patent  
Saner

(10) Patent No.: US 8,463,758 B2  
(45) Date of Patent: Jun. 11, 2013

(54) NETWORK REGISTRY AND FILE CLEANER

(75) Inventor: Guy Saner, London (GB)

(73) Assignee: Piriform Ltd., Nicosia (CY)

( * ) Notice: Subject to any disclaimer, the term of this patent is extended or adjusted under 35 U.S.C. 154(b) by 215 days.

(21) Appl. No.: 13/107,447

(22) Filed: May 13, 2011

(65) Prior Publication Data

US 2012/0290530 A1    Nov. 15, 2012

(51) Int. Cl.
*G06F 17/30* (2006.01)

(52) U.S. Cl.
USPC .......... 707/692; 707/609; 707/827; 707/952; 709/217; 709/220; 709/224

(58) Field of Classification Search
USPC ......................................... 707/692, 827, 952
See application file for complete search history.

(56) References Cited

U.S. PATENT DOCUMENTS

| | | | | |
|---|---|---|---|---|
| 6,021,510 | A * | 2/2000 | Nachenberg | 714/38.14 |
| 6,035,423 | A * | 3/2000 | Hodges et al. | 714/38.1 |
| 6,094,731 | A * | 7/2000 | Waldin et al. | 714/38.14 |
| 7,231,637 | B1 * | 6/2007 | McEwan | 717/171 |
| 7,266,843 | B2 * | 9/2007 | Tarbotton et al. | 726/22 |
| 8,281,019 | B1 * | 10/2012 | Woodard et al. | 709/228 |

OTHER PUBLICATIONS

R-Wipe&Clean Cleaning manual; © 2007 R-tools Technology, Inc.; pp. 1-44; http://www.r-tt.com/downloads/Disk_Cleaning_Manual.pdf.
Comodo System Cleaner—http://system-cleaner.comodo.com/system-cleaner-features.php.
Glary Utilities—http://www.glarysoft.com/products/utilities/glary-utilities/.

\* cited by examiner

*Primary Examiner* — Cheryl Lewis
(74) *Attorney, Agent, or Firm* — Squire Sanders (US) LLP

(57) ABSTRACT

A cleaning application that can clean at least one of one or more files and a registry of a computer is provided. The cleaning application can be remotely deployed over a network to one or more computers. The cleaning application can include an administrator cleaning module and a user cleaning module. The administrator cleaning module can automatically scan a network and detect one or more computers. The administrator cleaning module can then remotely deploy the user cleaning module to one or more selected computers of the network. Once the user cleaning module is deployed on a computer, the administrator cleaning module can remotely manage the user cleaning module over the network. In particular, the administrator cleaning module can instruct the user cleaning module to clean at least one of one or more files and a registry of the computer.

41 Claims, 15 Drawing Sheets

NETWORK REGISTRY AND FILE CLEANER

BACKGROUND

1. Field

Certain embodiments of the invention relate generally to computer systems, and, more particularly, to registry and file cleaning computer systems.

2. Description of the Related Art

A computer contains one or more computer files (i.e., files), where a file is a resource that stores data that can be accessed by a computer program that is executed within the computer. A computer also contains a registry, where a registry is a hierarchical database that is stored on the computer and stores configuration settings and options for the computer.

During the lifetime of a computer, thousands of files can end up being stored on the computer. Many of these files may never be used by any software modules that are executed within the computer. Thus, these files are unused files that merely take up storage space of the computer, and potentially slow down the processing speed of the computer. A file cleaning software module, when executed on the computer, can identify unused files and delete them from the computer.

Similarly, during the lifetime of the computer, a registry can become bloated with numerous configuration entries. In certain cases, many of the entries are not used by any computer program. For example, when a new version of a computer program is installed on the computer, the registry may be updated to contain a new entry corresponding to the new version. However, the old entry corresponding to the older version may not be deleted. Thus, a large number of entries in the registry may be superfluous. Similar to a file cleaning software module, a registry cleaning software module, when executed on the computer, can identify unused entries in a registry, and delete them from the registry.

SUMMARY

According to an embodiment of the invention, a method includes automatically scanning, by an administrator cleaning module executed on a computer, a network to detect computers. The method further includes selecting, by the administrator cleaning module, one or more computers from a list of computers detected on the network. The method further includes remotely deploying, by the administrator cleaning module, a user cleaning module over the network to the selected one or more computers.

According to another embodiment, an apparatus includes a memory configured to store an administrator cleaning module. The apparatus further includes a processor configured to execute the administrator cleaning module stored on the memory. The processor is further configured, when executing the administrator cleaning module stored on the memory, to, automatically scan a network to detect computers, select one or more computers from a list of computers detected on the network, and remotely deploy a user cleaning module over the network to the selected one or more computers.

According to another embodiment, a computer-readable medium includes a computer program stored thereon that, when executed by a processor, causes the processor to implement a method. The method includes automatically scanning a network to detect computers. The method further includes selecting one or more computers from a list of computers detected on the network. The method further includes remotely deploying a user cleaning module over the network to the selected one or more computers.

According to another embodiment, a method includes establishing, by an administrator cleaning module executed on a first computer, a secure connection over a network with a user cleaning module executed on a second computer. The method further includes receiving, by the administrator cleaning module, application information over the network from the user cleaning module. The method further includes transmitting, by the administrator cleaning module, a cleaning rule set over the network to the user cleaning module, where the cleaning rule set is based on the application information. The method further includes transmitting, by the administrator cleaning module, an instruction to clean at least one of one or more files and a registry of the second computer over the network to the user cleaning module, where the instruction is based on the cleaning rule set.

According to another embodiment, an apparatus includes a memory configured to store an administrator cleaning module. The method further includes a processor configured to execute the administrator cleaning module stored on the memory. The processor is further configured, when executing the administrator cleaning module stored on the memory, to, establish a secure connection over a network with a user cleaning module executed on a computer, receive application information over the network from the user cleaning module, transmit a cleaning rule set over the network to the user cleaning module, where the cleaning rule set is based on the application information, and transmit an instruction to clean at least one of one or more files and a registry of the computer over the network to the user cleaning module, where the instruction is based on the cleaning rule set.

According to another embodiment, a computer-readable medium includes a computer program stored thereon that, when executed by a processor, causes the processor to implement a method. The method includes establishing a secure connection over a network with a user cleaning module executed on a computer. The method further includes receiving application information over the network from the user cleaning module. The method further includes transmitting a cleaning rule set over the network to the user cleaning module, where the cleaning rule set is based on the application information. The method further includes transmitting an instruction to clean at least one of one or more files and a registry of the computer over the network to the user cleaning module, where the instruction is based on the cleaning rule set.

According to another embodiment, a method includes establishing, by a user cleaning module executed on a first computer, a secure connection over a network with an administrator cleaning module executed on a second computer. The method further includes transmitting, by the user cleaning module, application information over the network to the administrator cleaning module. The method further includes receiving, by the user cleaning module, a cleaning rule set over the network from the administrator cleaning module, where the cleaning rule set is based on the application information. The method further includes cleaning, by the user cleaning module, at least one of one or more files and a registry of the first computer, wherein the cleaning is based on an instruction and the cleaning rule set received from the administrator cleaning module.

According to another embodiment, an apparatus includes a memory configured to store a user cleaning module. The apparatus further includes a processor configured to execute the user cleaning module stored on the memory. The processor is further configured, when executing the user cleaning module stored on the memory, to, establish a secure connection over a network with an administrator cleaning module executed on a computer, transmit application information over the network to the administrator cleaning module, receive a cleaning rule set over the network from the administrator cleaning module, where the cleaning rule set is based on the application information, and clean at least one of one or more files and a registry of the apparatus based on an instruction and the cleaning rule set received from the administrator cleaning module.

According to another embodiment, a computer-readable medium includes a computer program stored thereon that, when executed by a processor, causes the processor to implement a method. The method includes establishing a secure connection over a network with an administrator cleaning module executed on a computer. The method further includes transmitting application information over the network to the administrator cleaning module. The method further includes receiving a cleaning rule set over the network from the administrator cleaning module, where the cleaning rule set is based on the application information. The method further includes cleaning at least one of one or more files and a registry, wherein the cleaning is based on an instruction and the cleaning rule set received from the administrator cleaning module.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein.

DETAILED DESCRIPTION

Figure 1:
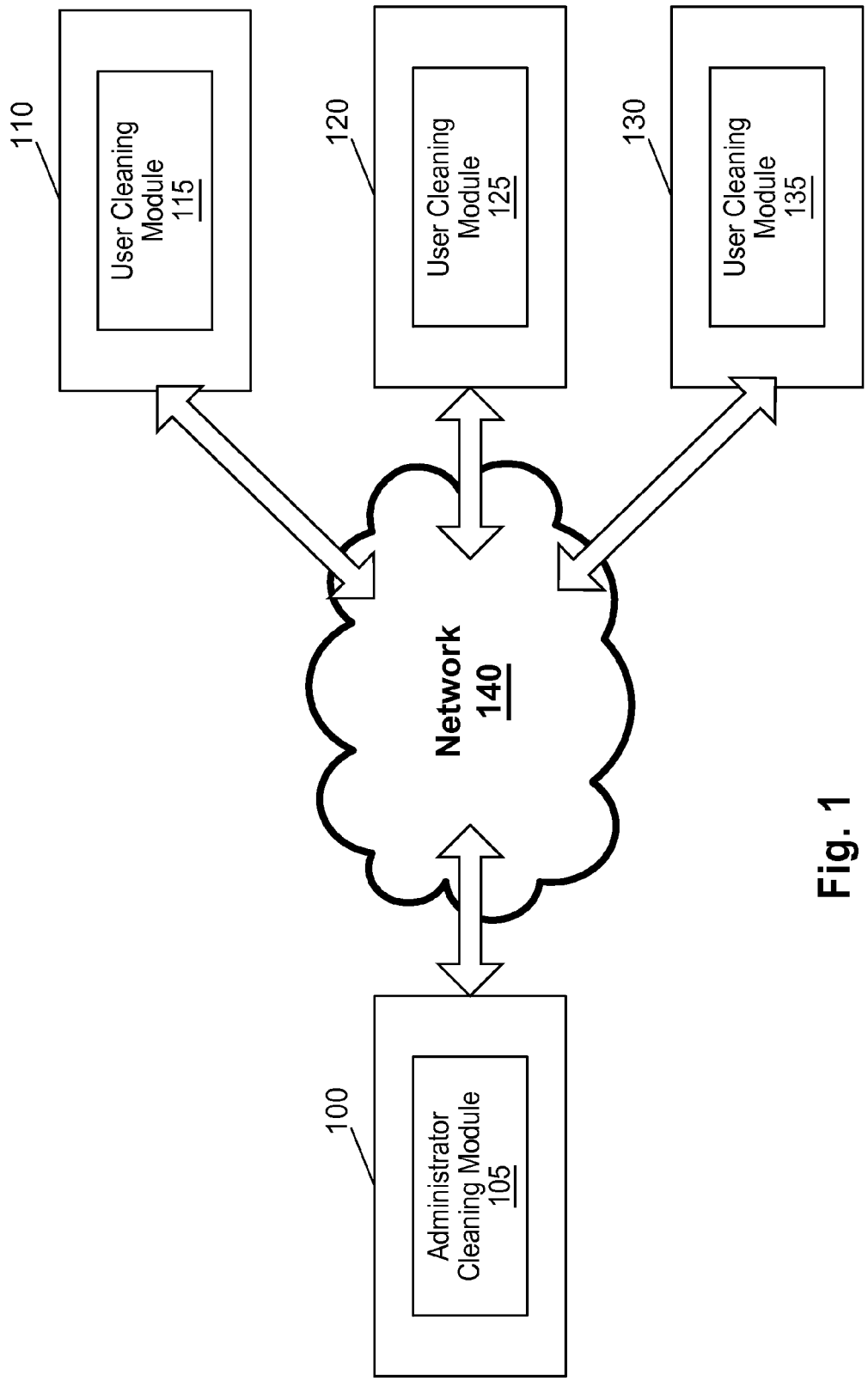
FIG. 1 illustrates a block diagram of a system, according to an embodiment of the invention.

It will be readily understood that the components of the present invention, as generally described and illustrated in the figures herein, may be arranged and designed in a wide variety of different configurations. Thus, the following detailed description of the embodiments of a method, apparatus, system, and computer-readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "an embodiment," "one embodiment," "another embodiment," "an alternative embodiment," "an alternate embodiment," "certain embodiments," "some embodiments," "different embodiments" or other similar language, throughout this specification refers to the fact that a particular feature, structure, or characteristic described in connection with the embodiment may be included in at least one embodiment of the present invention. Thus, appearances of the phrases "an embodiment," "one embodiment," "another embodiment," "an alternative embodiment," "an alternate embodiment," "in certain embodiments," "in some embodiments," "in other embodiments," "in different embodiments," or other similar language, throughout this specification do not necessarily all refer to the same group of embodiments, and the described features, structures, or characteristics may be combined in any suitable manner in one or more embodiments.

A "computer," as understood by one of ordinary skill in the art, is any programmable machine that receives input, automatically stores and manipulates data, and provides output. A "computer program" is any sequence of instructions written to perform a specific task on a computer, and has an executable form that a computer (typically through the use of a processor) can use to execute the instructions. A "computer module," "software module," or "module" is any computer program, or a portion thereof, that encapsulates related functions. A "computer application," "software application," or "application" is any collection of computer programs and/or modules. A "computer network" or "network" is any collection of computers interconnected by communication channels that facilitate communication among the computers.

In addition, a "service" or "web service," as understood by one of ordinary skill in the art, is a module or application designed to support interoperable computer-to-computer interaction over a network. A service can have an interface described in a computer-processable format. A computer can interact with a service by sending messages over a network protocol. Examples of services are Big Web services and RESTful services. Big Web services are services that follow a Simple Object Access Protocol (SOAP) standard and use Extensible Markup Language (XML) messages. RESTful services are services that utilize a Representational State Transfer (REST) style of software architecture, where clients are separate from servers by a uniform interface.

According to an embodiment of the invention, a cleaning application can be remotely deployed over a network to one or more computers. The cleaning application can clean at least one of one or more files and a registry of a computer. The cleaning application can include an administrator cleaning module and a user cleaning module. The administrator cleaning module can automatically scan a network and detect one or more computers. The administrator cleaning module can then remotely deploy the user cleaning module to one or more selected computers of the network. Once the user cleaning module is remotely deployed on a computer, the administrator cleaning module can remotely manage the user cleaning module over the network. The administrator cleaning module can establish a secure connection with the user cleaning module over the network. Once a secure connection is established, the administrator cleaning module can instruct the user cleaning module to clean at least one of one or more files and a registry of the computer.

FIG. 1 illustrates a block diagram of a system, according to an embodiment of the invention. The system includes computers 100, 110, 120, and 130. Computers 100, 110, 120, and 130 can each be any type of computer known in the art, such as a microcomputer, a personal computer, a desktop computer, a laptop computer, a notebook computer, a Palmtop computer, a server, a tablet computer, a smartphone, a smartbook, a personal digital assistant (PDA), a minicomputer, a mainframe computer, a supercomputer, a workstation, or an embedded computer. One of ordinary skill in the art would readily appreciate that the number of computers illustrated in FIG. 1 is merely an example number according to the embodiment, and that, in alternate embodiments, the system can include any number of computers.

The system also includes network 140. Network 140 can be any type of network that is known in the art, such as a local area network (LAN), a wide area network (WAN), a personal area network (PAN), a home area network (HAN), a campus area network (CAN), a metropolitan area network (MAN), a global area network (GAN), a storage area network (SAN), a virtual private network (VPN), a wireless network, a wireless LAN, a HomePNA, a power line communication network, a G.hn network, a Bluetooth network, an optical fiber network, an Ethernet network, an active networking network, a client-server network, a peer-to-peer network, a bus network, a star network, a ring network, a mesh network, a star-bus network, a tree network, or a hierarchical topology network. According to the embodiment, computer 100 can establish a connection with any of computers 110, 120, and 130 over network 140 using a network protocol. The network protocol can be any communication protocol that is known in the art, such as an Internet Protocol (IP), a Transmission Control Protocol (TCP), a User Datagram Protocol (UDP), an Internet Control Message Protocol (ICMP), a Hypertext Transfer Protocol (HTTP), a Post Office Protocol (POP), a File Transfer Protocol (FTP), or an Internet Message Access Protocol (IMAP). According to an embodiment, the network protocol can be a secured network protocol, and the connection between computer 100 and any of computers 110, 120, and 130 can be a secured connection. In the embodiment illustrated in FIG. 1, computer 100 can establish a connection with the three computers in the system, i.e., computers 110, 120, and 130, over network 140. However, this is merely an example, and in alternate embodiments, a computer can establish a connection with any number of computers over a network.

According to the embodiment, computer 100 includes administrator cleaning module 105. Administrator cleaning module 105 is a module that is executed by computer 100. Administrator cleaning module 105 can remotely deploy one or more user cleaning modules (such as user cleaning modules 115, 125, and 135) to computers 110, 120, and 130 over network 140. Administrator cleaning module 105 can also remotely manage file and registry cleaning performed by the deployed one or more user cleaning modules. The functionality of administrator cleaning module 105 is described below in greater detail in relation to FIG. 2.

Also according to the embodiment, computer 110 includes user cleaning module 115, computer 120 includes user cleaning module 125, and computer 130 includes user cleaning module 135. User cleaning modules 115, 125, and 135 are each modules that are executed by computers 110, 120, and 130, respectively. User cleaning modules 115, 125, and 135 can each perform file and registry cleaning on computers 110, 120, and 130, respectively, where the file and registry cleaning can be managed by administrator cleaning module 105. The functionality of user cleaning modules 115, 125, and 135 is described below in greater detail in relation to FIG. 3.

According to an embodiment, once administrator cleaning module 105 has remotely deployed user cleaning modules 115, 125, and 135, administrator cleaning module 105 can establish a connection with user cleaning modules 115, 125, and 135 over network 140. The connection can be established using a network protocol of network 140. In one embodiment, the connection can be a secured connection.

According to an embodiment, once administrator cleaning module 105 has remotely deployed user cleaning modules 115, 125, and 135, a unique paring can be created between each of user cleaning modules 115, 125, and 135 and administrator cleaning module 105. Thus, even if additional administrator cleaning modules are executed on computers connected to network 140, each additional administrator cleaning module can only connect to the user cleaning modules which have been remotely deployed from that particular administrator cleaning module. In the embodiment illustrated in FIG. 1, administrator cleaning module 105 has remotely deployed, and thus is uniquely paired with, three user cleaning modules (i.e., user cleaning modules 115, 125, and 135). However, this is merely an example, and in alternate embodiments, an administrator cleaning module can remotely deploy, and thus, be uniquely paired with, any number of user cleaning modules.

Figure 2:
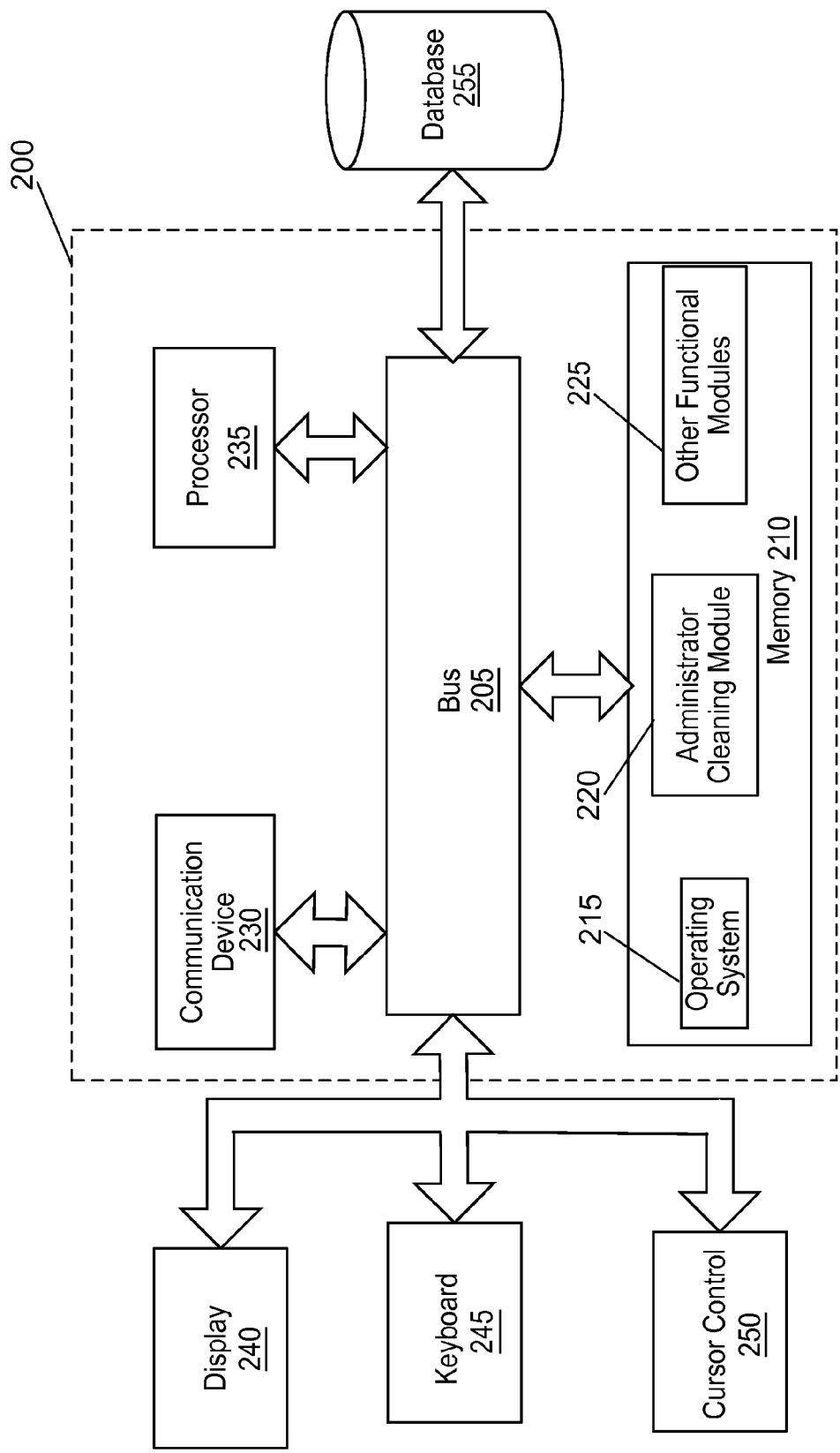
FIG. 2 illustrates a block diagram of an apparatus that implements an administrator cleaning module, according to an embodiment of the invention.

FIG. 2 illustrates a block diagram of an apparatus 200 that implements an administrator cleaning module 220, according to an embodiment of the invention. In one embodiment of the invention, apparatus 200 is a computer similar to computer 100 of FIG. 1. Apparatus 200 includes a bus 205 or other communication mechanism for communicating information between components of apparatus 200. Apparatus 200 also includes a processor 235, operatively coupled to bus 205, for processing information and executing instructions or operations. Processor 235 may be any type of general or specific purpose processor. Apparatus 200 further includes a memory 210 for storing information and instructions to be executed by processor 235. Memory 210 can be comprised of any combination of random access memory (RAM), read only memory (ROM), static storage such as a magnetic or optical disk, or any other type of machine or computer-readable medium. Apparatus 200 further includes a communication device 230, such as a network interface card or other communication interface, to provide access to a network. As a result, a user may interface with apparatus 200 directly, or remotely through a network or any other method. In addition, apparatus 200 may interface with any other computers or devices through a network.

A computer-readable medium may be any available medium that can be accessed by processor 235. A computer-readable medium may include both a volatile and nonvolatile medium, a removable and non-removable medium, and a storage medium. A storage medium may include RAM, flash memory, ROM, erasable programmable read-only memory (EPROM), electrically erasable programmable read-only memory (EEPROM), registers, hard disk, a removable disk, a compact disc read-only memory (CD-ROM), or any other form of storage medium known in the art.

Processor 235 can also be operatively coupled via bus 205 to a display 240, such as a Liquid Crystal Display (LCD). Display 240 can display information to the user. A keyboard 245 and a cursor control device 250, such as a computer mouse, can also be operatively coupled to bus 205 to enable the user to interface with apparatus 200.

According to one embodiment, memory 210 can store software modules that may provide functionality when executed by processor 235. The modules can include administrator cleaning module 220. Administrator cleaning module 220 can remotely deploy one or more user cleaning modules to one or more computers over network. According to the embodiment, administrator cleaning module 220 can automatically scan for computers in order to detect the computers on a network. Based on the automatic scan, administrator cleaning module 220 can select one or more computers from a list of computers detected on the network. Once one or more computers have been selected, administrator cleaning module 220 can remotely deploy a user cleaning module to the selected one or more computers.

Furthermore, administrator cleaning module 220 can also remotely manage file and registry cleaning performed by the deployed one or more user cleaning modules. According to the embodiment, administrator cleaning module 220 can establish a secure connection over a network with a user cleaning module deployed on another computer. Once a secure connection is established, administrator cleaning module 220 can receive application information over the network from the user cleaning module, transmit a cleaning rule set over the network to the user cleaning module based on the received application information, and transmit an instruction to clean at least one of one or more files and a registry of the other computer over the network to the user cleaning module.

According to the embodiment, the modules can also include an operating system 215, as well as other functional modules 225. Operating system 215 can provide an operating system functionality for apparatus 200. Apparatus 200 can also be part of a larger system. Thus, apparatus 200 can include one or more additional functional modules 225 to include additional functionality for the system.

Processor 235 can also be operatively coupled via bus 205 to a database 255. Database 255 can store data in an integrated collection of logically-related records or files. Database 255 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 3:
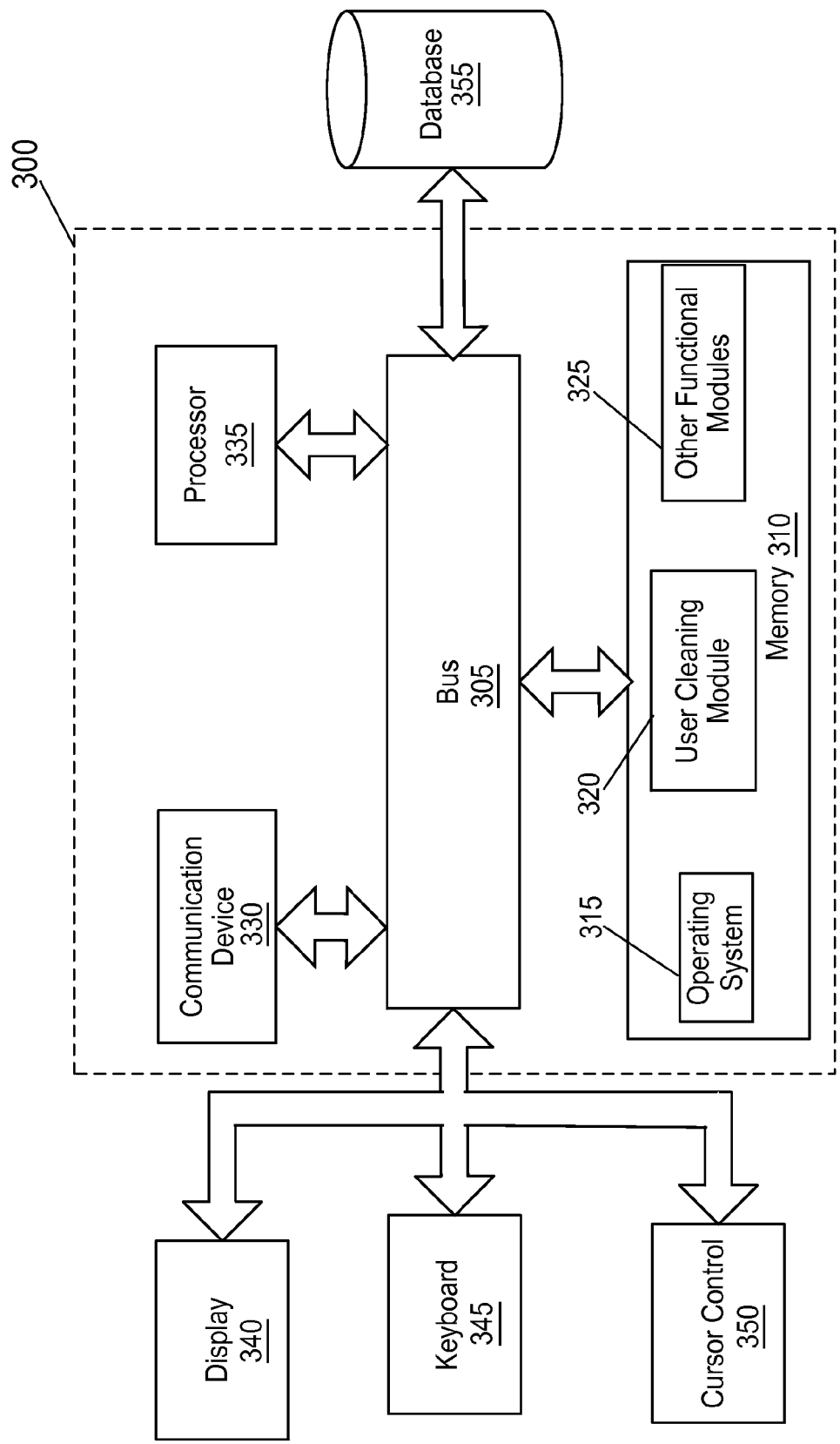
FIG. 3 illustrates a block diagram of an apparatus that implements a user cleaning module, according to an embodiment of the invention.

FIG. 3 illustrates a block diagram of an apparatus 300 that implements a user cleaning module 320, according to an embodiment of the invention. In one embodiment of the invention, apparatus 300 is a computer similar to computers 110, 120, and 130 of FIG. 1. Similar to apparatus 200 of FIG. 2, apparatus 300 includes a bus 305, a memory 310, operating system 315, other functional modules 325, communication device 330, processor 335, display 340, keyboard 345, cursor control 350, and database 355. Bus 305 performs similar functionality to bus 205 of FIG. 2, memory 310 performs similar functionality to memory 210 of FIG. 2, operating system 315 performs similar functionality to operating system 215 of FIG. 2, other functional modules 325 perform similar functionality to other functional modules 225 of FIG. 2, communication device 330 performs similar functionality to communication device 230 of FIG. 2, processor 335 performs similar functionality to processor 235 of FIG. 2, display 340 performs similar functionality to display 240 of FIG. 2, keyboard 345 performs similar functionality to keyboard 245 of FIG. 2, cursor control 350 performs similar functionality to cursor control 250 of FIG. 2, and database 355 performs similar functionality to database 255 of FIG. 2.

According to one embodiment, the software modules stored in memory 310, that may provide functionality when executed by processor 335, include user cleaning module 320. User cleaning module 320 can perform file and registry cleaning on apparatus 300, where the file and registry cleaning can be remotely managed by an administrator cleaning module. According to the embodiment, user cleaning module 320 can establish a secure connection over a network with an administrator cleaning module. Once the secure connection has been established, user cleaning module 320 can transmit application information over the network to the administrator cleaning module. In response, user cleaning module 320 can receive a cleaning rule set over the network from the administrator cleaning module, where the cleaning rule set is based on the application information. In response to receiving the cleaning rule set, user cleaning module 320 can clean at least one of one or more files and a registry of apparatus 300, where the cleaning is based on an instruction and the cleaning rule set received by the administrator cleaning module.

FIGS. 4, 5, 6, 10, 11, 12, and 13 each illustrate a method according to an embodiment of the invention. The steps of a method or algorithm described in connection with the embodiments disclosed herein may be embodied directly in hardware, in a computer program executed by a processor, or in a combination of the two. A computer program may be embodied on a computer-readable medium, such as a storage medium. For example, a computer program may reside in RAM, flash memory, ROM, EPROM, EEPROM, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components. Furthermore, a computer-readable medium may be any type of tangible medium.

Figure 4:
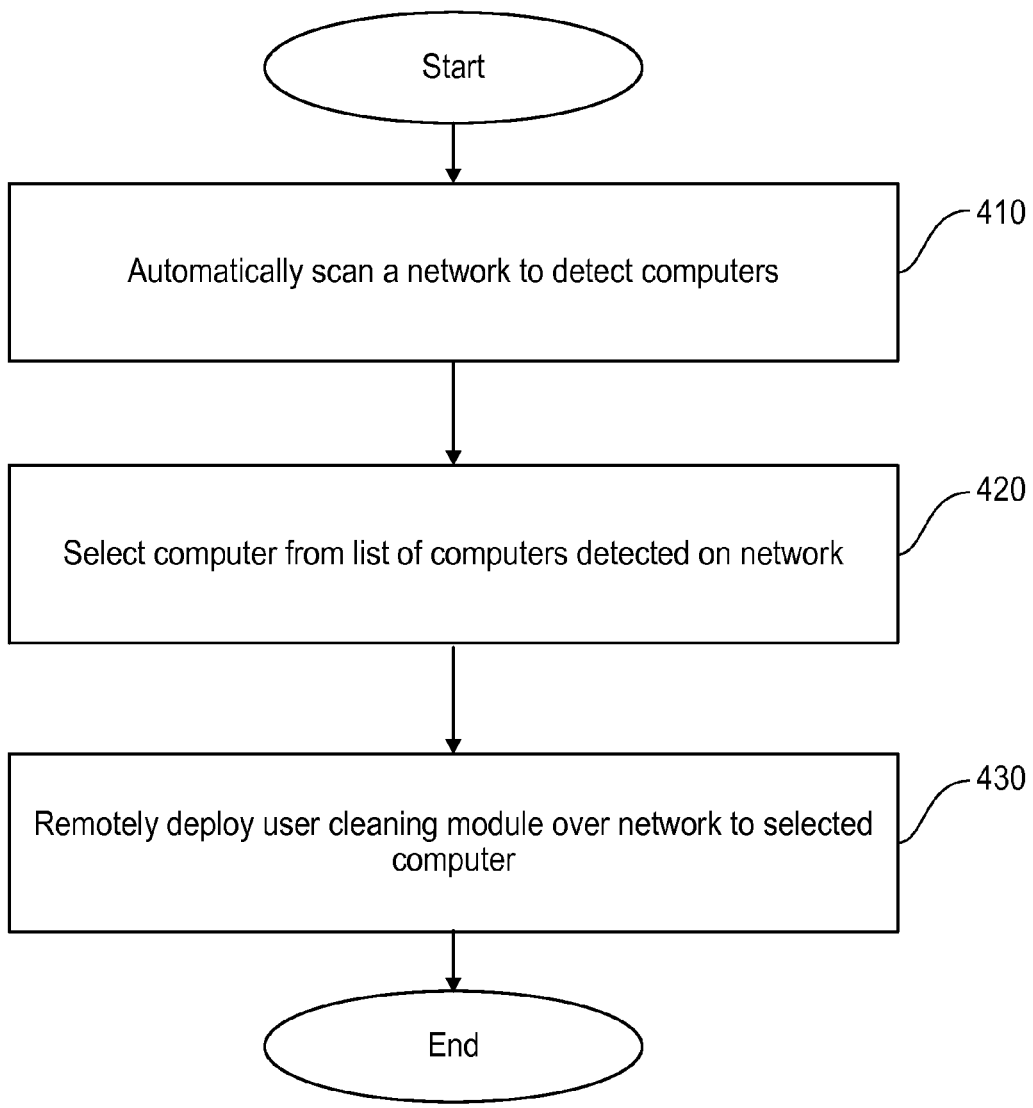
FIG. 4 illustrates a flow diagram of a method, according to an embodiment of the invention.

FIG. 4 illustrates a flow diagram of a method, according to an embodiment of the invention. In one embodiment, the method can be implemented by an administrator cleaning module executed on a computer. As previously described, an administrator cleaning module can remotely deploy one or more user cleaning modules.

According to the embodiment, the method begins, and, at step 410, a network is automatically scanned to detect computers. In one embodiment, a Microsoft® Windows® NetBIOS application programming interface is used to identify one or more computers connected to the network that have registered a NetBIOS name, a NetBIOS group name, or a combination of the two. The method then proceeds to step 420.

At step 420, a computer is selected from a list of computers detected on the network. The automatic scan process and the selection process is described below in greater detail in relation to FIG. 5. The method then proceeds to step 430.

At step 430, a user cleaning module is remotely deployed over the network to the one or more selected computers. As previously described, a user cleaning module can perform file and registry cleaning on the selected computer. In one embodiment, a previous user cleaning module that is already deployed on the selected one or more computers is uninstalled, before the user cleaning module is remotely deployed. The remote deployment process is described below in greater detail in relation to FIG. 6. After step 430, the method ends.

Figure 5:
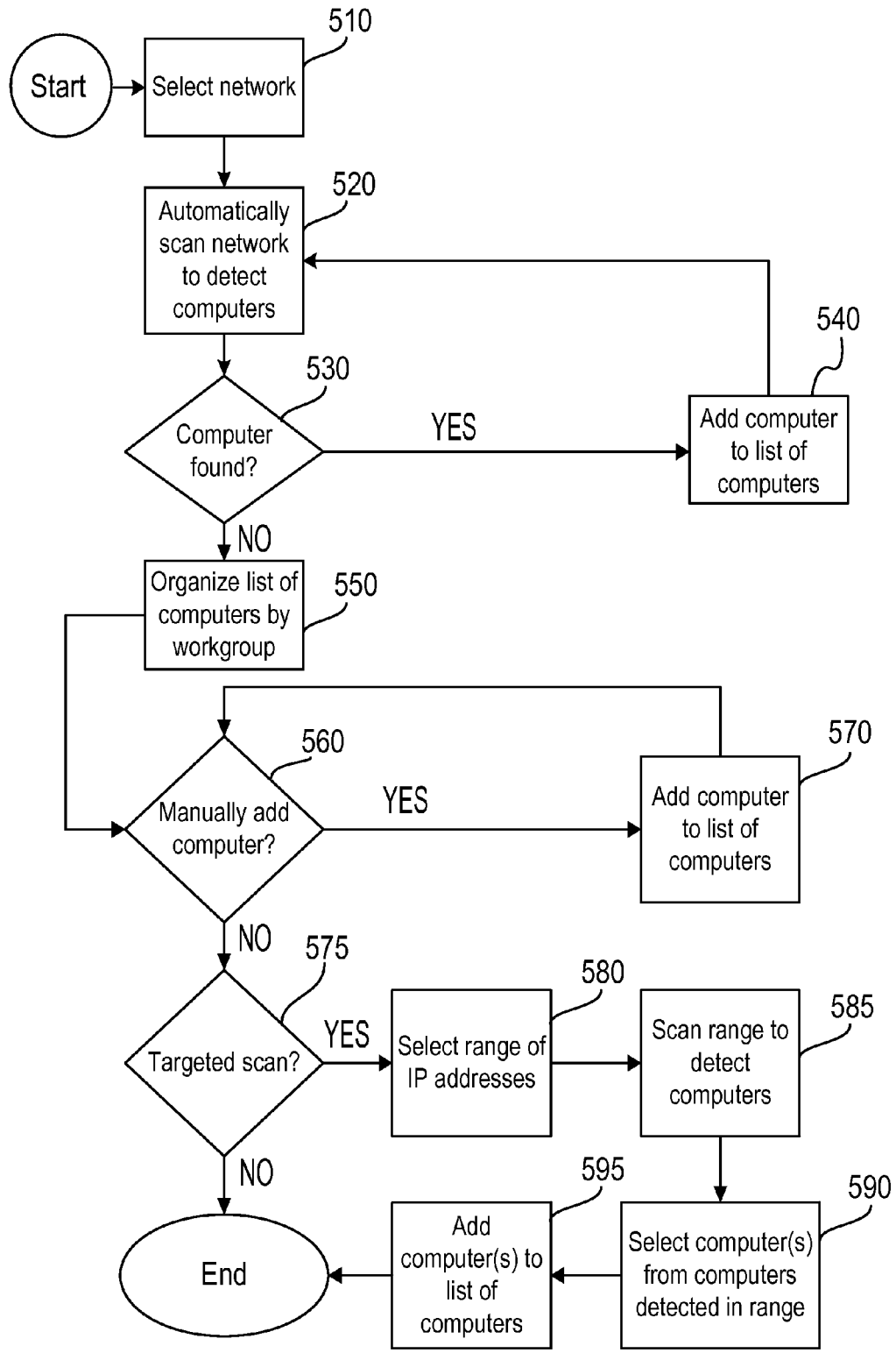
FIG. 5 illustrates a flow diagram of a method for automatically scanning a network and selecting one or more computers, according to an embodiment of the invention.

FIG. 5 illustrates a flow diagram of a method for automatically scanning a network and selecting one or more computers, according to an embodiment of the invention. According to the embodiment, the following steps can be performed before remotely deploying a user cleaning module.

In the embodiment, the flow begins, and, at step 510, the administrator cleaning module selects a network. The administrator cleaning module can select a network in response to an administrator selecting a network tree entitled "Network" that is displayed at a user interface of the administrator cleaning module. The network can be a network that the computer that executes the administrator cleaning module can connect to. The flow then proceeds to step 520.

At step 520, the administrator cleaning module automatically scans the selected network to detect computers. In one embodiment, the administrator cleaning module automatically scans the network using a Microsoft® Windows® NetBIOS application programming interface (API). By using the NetBIOS API, the administrator cleaning module can identify all computers connected to the network that have registered either a NetBIOS name, a NetBIOS group name, a combination of the two. The flow then proceeds to step 530.

At step 530, the administrator cleaning module determines whether a computer on the network has been found. According to the embodiment, the administrator cleaning module can analyze the results of the automatic scan to identify how many (if any) computers were found by the automatic scan. If one or more computers were found, the flow proceeds to step 540. If no computers were found, the flow skips step 540, and proceeds to step 550.

At step 540, the administrator cleaning module adds the computer to a list of computers. According to the embodiment, the administrator cleaning module can store a list of computers found using the automatic scan. The administrator cleaning module can subsequently display this list to an administrator in its user interface. The flow then returns to step 530, where the administrator cleaning module determines whether additional computers were also found. Thus, according to the embodiment, steps 530 and 540 will be repeated for each computer found on the network.

At step 550, the administrator cleaning module organizes the list of computers by workgroup or group. For example, instead of keeping the computers in one group, such as "WORKGROUP," the administrator cleaning module can create one or more groups, such as "IT SUPPORT," "SALES DEPT," "MARKETING," etc. The administrator cleaning module can then keep the computers in the appropriate group. The administrator cleaning module can determine which computer should be in which group based on characteristics of the computer, such as computer name, IP address, NetBIOS name, and NetBIOS group name. According to the embodiment, the names of the groups, and the members of the group, can be edited by the administrator. The flow then proceeds to step 560.

At step 560, the administrator cleaning module determines whether it needs to manually add a computer. As an example, an administrator may have personal knowledge that a computer is connected to the network; yet for some reason, the automatic scan may not be able to detect the computer. Thus, it may be necessary to manually add the computer to the list of computers. In one example, the administrator cleaning module can determine that it needs to manually add a computer by receiving input from the administrator using the user interface. For example, an administrator may "right-click" a network or group name displayed on the user interface, and then click "New Host." If the administrator cleaning module determines it needs to manually add a computer, the flow proceeds to step 570. If the administrator cleaning module determines it does not need to manually add a computer, the flow then proceeds to step 575.

At step 570, the administrator cleaning module adds the computer to the list of computers. According to an embodiment, an administrator may enter information regarding the computer in a dialog box displayed at the user interface. For example, in an "Add a new host" dialog box, an administrator may add a computer name, user name, password, and one or more IP addresses of a computer. The administrator cleaning module then stores the information regarding the computer and adds the computer to the list. The flow then returns to step 560, where the administrator cleaning module determines whether it needs to manually add another computer. Thus, according to the embodiment, steps 560 and 570 will be repeated for each computer that the administrator cleaning module needs to manually add.

At step 575, the administrator cleaning module determines whether it needs to execute a targeted scan. According to the embodiment a targeted scan is a scan of an identified range of IP addresses. In one example, the administrator cleaning module can determine that it needs to execute a targeted scan by receiving input from the administrator using the user interface. For example, an administrator can "click" on an icon entitled "Tools," displayed in the user interface and then "click" on a subsequent icon entitled "Advanced host detection." If the administrator cleaning module determines it needs to execute a targeted scan, the flow proceeds to step 580. If the administrator cleaning module determines it does not need to execute a targeted scan, the flow ends.

At step 580, the administrator cleaning module selects a range of IP addresses. According to the embodiment, an administrator may enter information regarding the range of IP addresses in a dialog box displayed at the user interface. The flow then proceeds to step 585.

At step 585, the administrator cleaning module scans the range of IP addresses to detect any computers with an IP address within the range of IP addresses. According to the embodiment, upon detecting one or more computers, the administrator cleaning module can display a list of the one or more computers at the user interface. The flow then proceeds to step 590.

At step 590, the administrator cleaning module selects one or more computers from the list of computers detected within the range of IP addresses. According to the embodiment, an administrator can select one or more computers to add from the list of the one or more computers displayed at the user interface. In one embodiment, the administrator can also select which group to add each computer to. The flow then proceeds to step 595.

At step 595, the administrator cleaning module adds the one or more computer to the list of computers. According to the embodiment, the administrator cleaning module stores the information regarding the one or more computers and adds the one or more computers to the list. After step 595, the flow ends.

Figure 6:
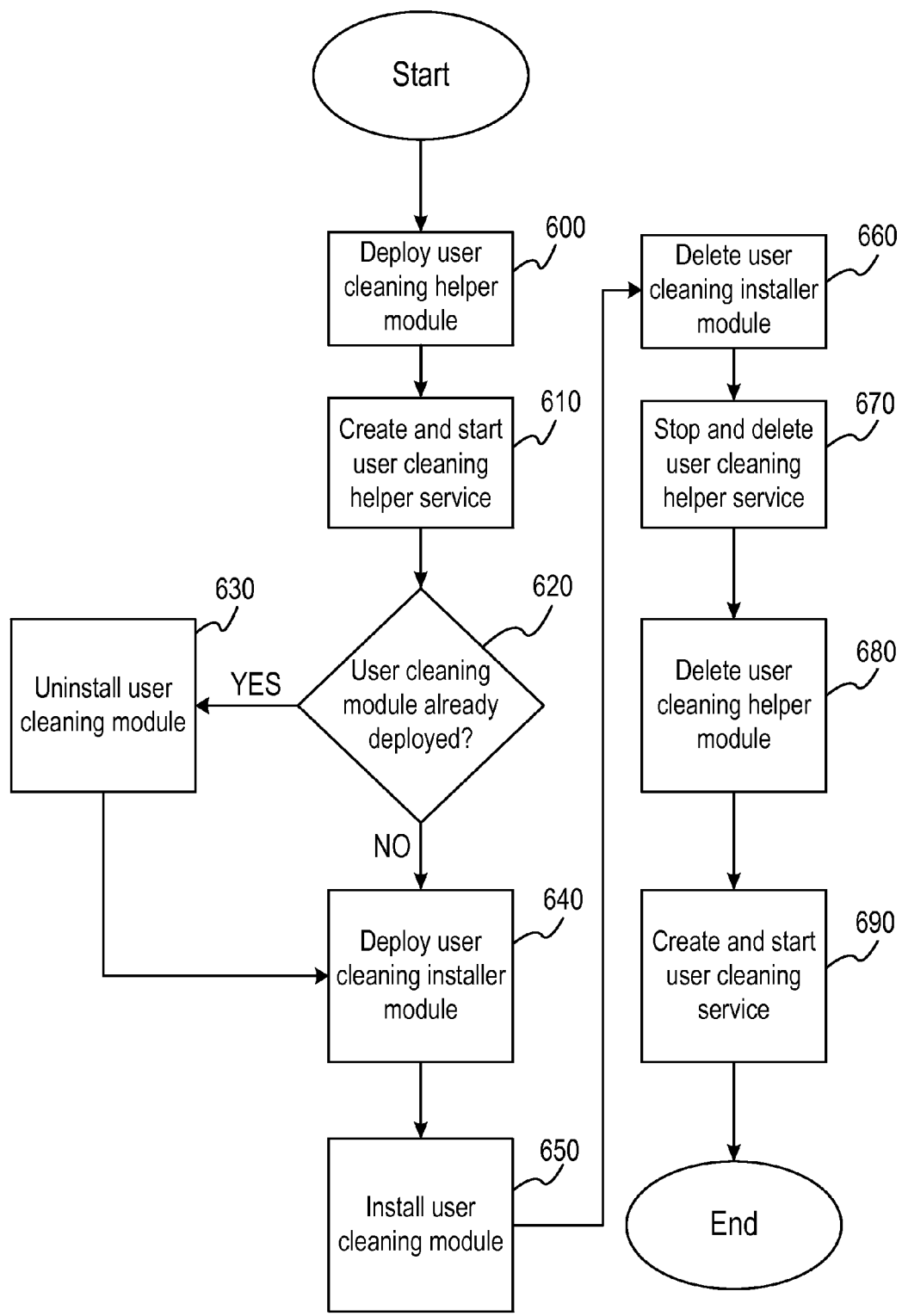
FIG. 6 illustrates a flow diagram of a method for remotely deploying a user cleaning module to a computer over a network, according to an embodiment of the invention.

FIG. 6 illustrates a flow diagram of a method for remotely deploying a user cleaning module to a computer over a network, according to an embodiment of the invention. According to the embodiment, the following steps can be performed after automatically scanning a network and selecting one or more computers.

In the embodiment, the flow begins, and, at step 600, the administrator cleaning module, executed on a first computer, remotely deploys a user cleaning helper module onto a second computer over a network. A user cleaning helper module is a module that can, at least in part, facilitate a remote deployment and installation of a user cleaning module onto a computer. In one embodiment, the user cleaning helper module can be stored in an executable file. The administrator cleaning module can copy the executable file containing the user cleaning helper module from the first computer to the second computer over the network. In one embodiment, the executable file containing the user cleaning helper module can be copied into a directory of the second computer.

According to the embodiment, the administrator cleaning module has permission to copy and install modules onto the second computer. In one embodiment, once the user cleaning helper module has been remotely deployed onto the second computer, the user cleaning helper module establishes a connection to a service control manager on the second computer. This can facilitate the creation and initiation of one or more services that can be executed on the second computer, as described below in greater detail. The flow then proceeds to step 610.

At step 610, the administrator cleaning module creates and starts a user cleaning helper service on the second computer using the user cleaning helper module. According to the embodiment, the user cleaning helper service is a service that is executed on the second computer, and can, at least in part, facilitate a remote deployment and installation of a user cleaning module onto a computer. The flow then proceeds to step 620.

At step 620, the administrator cleaning module determines whether a user cleaning module has already been deployed onto the second computer using the user cleaning helper service. According to the embodiment, an older version of the user cleaning module may have already been deployed onto the second computer. In this embodiment, the older version of the user cleaning module may need to be stopped and deleted before a new version of the user cleaning module can be deployed. Therefore, a determination can be made regarding whether the user cleaning module has already been deployed, to avoid multiple versions of the user cleaning module being deployed onto a single computer. If a user cleaning module has already been deployed onto the second computer, the flow proceeds to step 630. If a user cleaning module has not already been deployed onto the second computer, the flow skips step 630, and proceeds to step 640.

At step 630, the administrator cleaning module uninstalls the user cleaning module that is already deployed onto the second computer using the user cleaning helper service. In one embodiment, the user cleaning helper service "quietly" uninstalls the user cleaning module. A "quiet" uninstall is an uninstall that occurs on a computer without an indication of the uninstall being displayed at a user interface of the computer. The uninstall occurs without the knowledge of a user, and thus, is "quiet." The user cleaning helper service can uninstall the user cleaning module that is already deployed by stopping any service associated with the user cleaning module, if such a service is running, and deleting the user cleaning module from the second computer.

In one embodiment, after the user cleaning helper service uninstalls the user cleaning module, the user cleaning helper service is stopped and deleted from the second computer, and the user cleaning helper module is deleted from the second computer as well. In the embodiment, steps 610 and 620 are repeated, before the flow then proceeds to step 640. In an alternate embodiment, after the user cleaning helper service uninstalls the user cleaning module, the flow proceeds directly to step 640.

At step 640, the administrator cleaning module remotely deploys a user cleaning installer module onto the second computer over a network. A user cleaning installer module is a module that can install a user cleaning module onto a computer. In one embodiment, the user cleaning installer module can be stored in an executable file. The administrator cleaning module can copy the executable file containing the user cleaning installer module from the first computer to the second computer. In one embodiment, the executable file containing the user cleaning installer module can be copied into a directory of the second computer. The flow then proceeds to step 650.

At step 650, the administrator cleaning module installs a user cleaning module onto the second computer using the user cleaning installer module. As previously described, a user cleaning module is a module that can perform file and registry cleaning on a computer when executed. According to the embodiment, the user cleaning installer module can perform a "quiet" install of the user cleaning module, as previously described. In one embodiment, the user cleaning installer module can install the user cleaning module from a command-line interface, where a command-line interface is a mechanism for interacting with a computer that allows a user (either a human user or an automated user) to type commands in a text-only user interface to perform specific tasks. A user can be automated through the use a batch file that can be stored on the second computer. The flow then proceeds to step 660.

At step 660, the administrator cleaning module deletes the user cleaning installer module from the second computer. According to the embodiment, the deletion can include deleting the executable file that contains the user cleaning installer module from the second computer. The flow then proceeds to step 670.

At step 670, the administrator cleaning module stops and deletes the user cleaning helper service from the second computer. According to the embodiment, the administrator cleaning module can instruct a service control manager of the second computer to stop the user cleaning helper service so that the service no longer executes on the second computer. The administrator cleaning module can also instruct the service control manager to delete the user cleaning helper service from a set of available services on the second computer, so that the service can no longer be started on the second computer. The flow then proceeds to step 680.

At step 680, the administrator cleaning module deletes the user cleaning helper module from the second computer. According to the embodiment, the deletion can include deleting the executable file that contains the user cleaning helper module from the second computer. The flow then proceeds to step 690.

At step 690, the administrator cleaning module creates and starts a user cleaning service on the second computer using the user cleaning module. According to the embodiment, the user cleaning service is a service that is executed on the second computer, and can, at least in part, facilitate file and registry cleaning on the second computer, as will be described in greater detail. After step 690, the flow ends.

Figure 7:
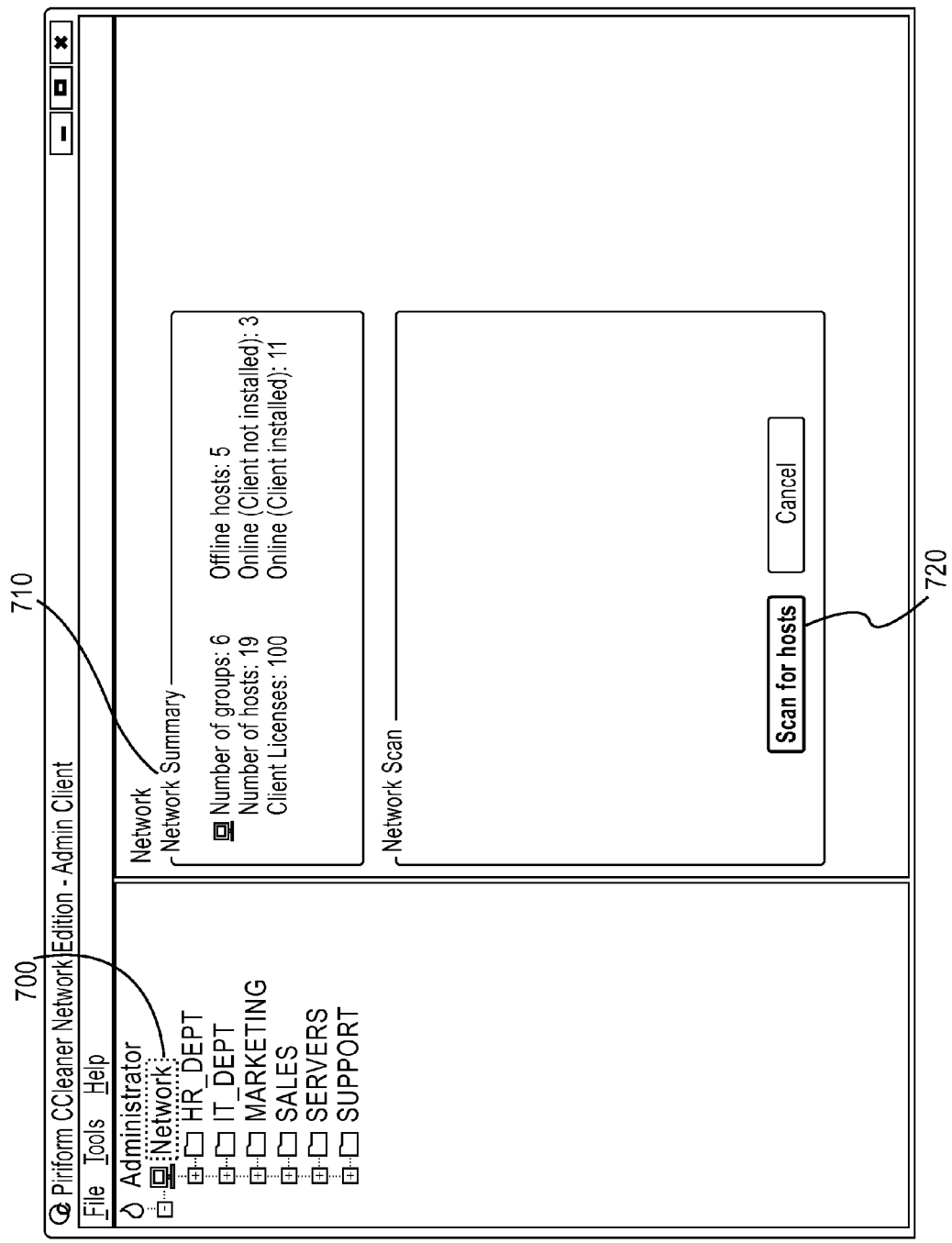
FIG. 7 illustrates a user interface of an administrator cleaning module, according to an embodiment of the invention.
Figure 8:
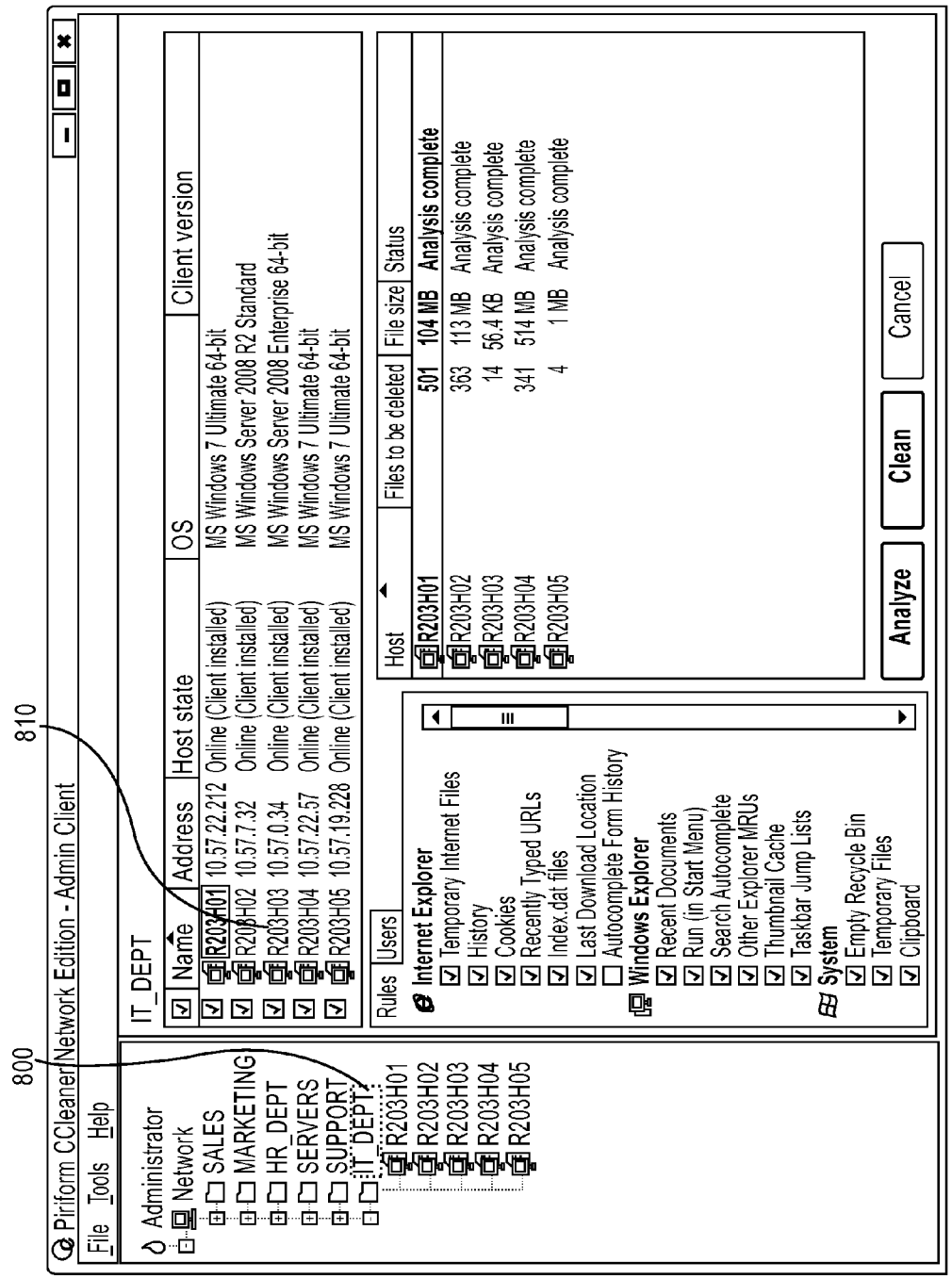
FIG. 8 illustrates another user interface of an administrator cleaning module, according to an embodiment of the invention.
Figure 9:
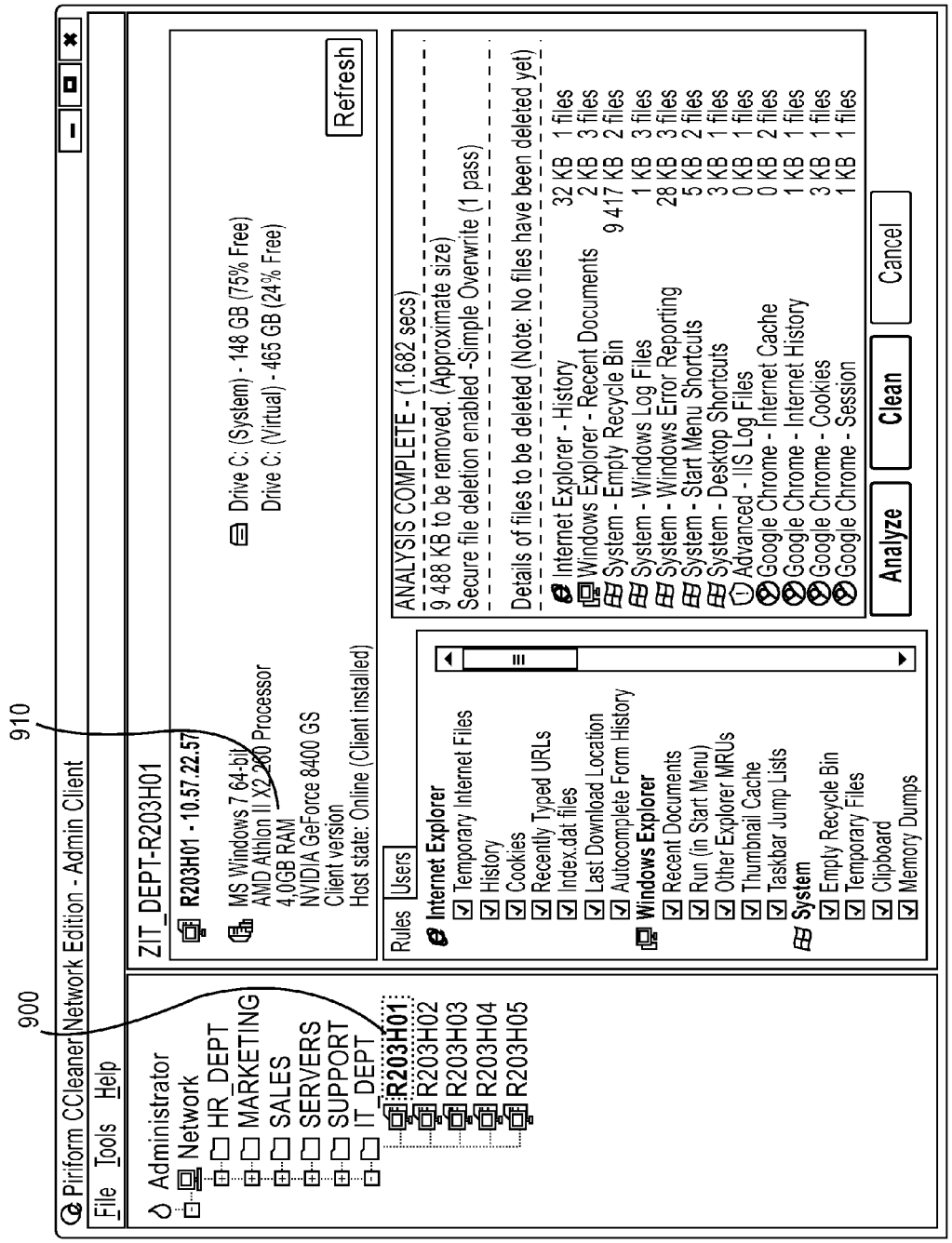
FIG. 9 illustrates another user interface of an administrator cleaning module, according to an embodiment of the invention.

FIGS. 7-9 illustrate a user interface that can be created by an administrator cleaning module, executed on a computer, where the user interface is displayed to an administrator at a screen of the computer. However, as one of ordinary skill in the art would readily appreciate, the user interface illustrated in FIGS. 7-9 is merely an example user interface according to an embodiment of the invention. In alternate embodiments, the administrator cleaning module may display a user interface that has a different appearance from the user interface illustrated in FIGS. 7-9. In one embodiment, the user interface can be a separate web service that can be executed by the administrator cleaning module, where the administrator cleaning module is executed on the computer. In another embodiment, the user interface can be a separate API that can be executed by the administrator cleaning module, where the administrator cleaning module is executed on the computer. Furthermore, in alternate embodiments, the administrator cleaning module may not display a user interface to an administrator. In some of these embodiments, an administrator interfaces with the administrator cleaning module using a web interface. A web interface allows an administrator to interface with the administrator cleaning module over a network connection, such as the Internet. The administrator can connect with the administrator cleaning module, for example, over HTTP. The web interface can be located at the same computer of the administrator cleaning module, or a separate computer, depending on the embodiment. In other alternate embodiments, there is no user interface associated with the administrator cleaning module, whatsoever.

FIG. 7 illustrates a user interface of an administrator cleaning module, according to an embodiment of the invention. According to the embodiment, the user interface displayed in FIG. 7 is an example user interface that can be displayed before the administrator cleaning module performs an automatic scan of the network, and selected one or more computers.

According to the embodiment, the user interface can display network tree 700. Network tree 700 is a visual representation of a network that the administrator cleaning module is connected to. In the illustrated embodiment, in response to an administrator expanding the network by "clicking" an icon associated with the displayed network, network tree 700 displays the following groups: "HR_DEPT," "IT_DEPT," "MARKETING," "SALES," "SERVERS," and "SUPPORT."

According to the embodiment, the user interface can also display network summary 710. Network summary 710 represents a summary of the network that the administrator cleaning module is connected to. In the illustrated embodiment, network summary 710 displays the following information: the number of groups in the network (in this example, 6), the number of hosts, or computers, in the network (in this example, 19), the number of client, or user cleaning module, licenses (in this example, 100), the number of offline computers (in this example, 5), the number of online computers where a user cleaning module has not been installed, or deployed, (in this example, 3), and the number of online computers where a user cleaning module has been deployed (in this example, 11). In this example, the number of groups in the network indicates the number of groups displayed in network tree 700. The number of computers in the network indicates the number of computers connected to the network that were detected in a previous automatic scan of the network. The number of user cleaning module licenses indicates the number of allotted licenses for the user cleaning module. Thus, the number of user cleaning module licenses also indicates the maximum number of computers in a network that a user cleaning module can be deployed to. The number of offline computers indicates the number of computers that were formerly connected to the network, but are no longer connected. The number of online computers where a user cleaning module has not been deployed indicates the number of computers detected in a previous automatic scan, where the administrator cleaning module has not deployed a user cleaning module. The number of online computers where a user cleaning module has been deployed indicates the number of computers detected in a previous automatic scan, where the administrator cleaning module has deployed a user cleaning module.

According to the embodiment, to add computers to the list of computers displayed by the administrator cleaning module, an administrator, or other type of user, can "click" a network displayed in network tree 700, and subsequently "click" on an automatic scan button 720. In the illustrated embodiment, scan button 720 is entitled "Scan for hosts." By "clicking" automatic scan button 720, the administrator can initiate an automatic scan and selection process previously described in relation to FIGS. 4 and 5.

According to the embodiment, if a known computer on the network does not appear in the list, the administrator can use the user interface illustrated in FIG. 7 to manually add the computer to the list. The administrator can manually add the computer to the list by "right-clicking" a network or group name displayed in network tree 700 and then clicking an icon entitled "New Host" (not shown in FIG. 7). This will cause the user interface to display a dialog box entitled "Add a new host" (not shown in FIG. 7). In the dialog box displayed by the user interface, the administrator can enter a computer name, user name, password, and one or more IP addresses of a computer.

According to the embodiment, if a known computer on the network does not appear in the list, the administrator can also use the user interface illustrated in FIG. 7 to perform a targeted scan of an identified range of IP addresses. The administrator can manually add the computer to the list by "clicking" an icon entitled "Tools," and then "clicking" on a subsequent icon entitled "Advanced host detection" (not shown in FIG. 7). In the dialog box displayed by the interface, the administrator can enter a range of IP addresses. After the administrator cleaning module scans the identified range of IP addresses, and displays one or more computers detected at the identified range, the administrator can manually select one or more computers to be added to the list. In an embodiment, the administrator can also select which group to add each computer to.

FIG. 8 illustrates another user interface of an administrator cleaning module, according to an embodiment of the invention. According to the embodiment, the user interface displayed in FIG. 8 is an example user interface that can be displayed after the administrator cleaning module has performed an automatic scan of the network, and selected one or more computers.

According to the embodiment, the user interface can display network tree 800. Network tree 800 is similar to network tree 700, but in response to an administrator expanding the group "IT_DEPT" by "clicking" an icon associated with the group "IT_DEPT," network tree 800 displays the computers associated the group "IT_DEPT." In the illustrated embodiment, network tree 800 displays the computers "R203H01," "R203H02," "R203H03," "R203H04," and "R203H05."

According to the embodiment, the user interface can also display group summary 810. Group summary 810 represents a summary of the group selected in network tree 800. In the illustrated embodiment, group summary 810 displays the following information for each computer: computer name, IP address, computer state, operating system (OS), and user cleaning module version. In the example, the computer name indicates the name of the displayed computer. The IP address indicates an IP address of the displayed computer.

Furthermore, in the example, the computer state indicates one of four states: "Online (Client installed)," "Online (Client not installed)," "Client paired with different instance of CCN," and "Offline." The state "Online (Client installed)," indicates that the displayed computer is connected to the network, and that the administrator cleaning module has deployed a user cleaning module onto the displayed computer. The state "Online (Client not installed)," indicates that the displayed computer is connected to the network, but that the administrator cleaning module has not deployed a user cleaning module onto the displayed computer. The state "Client paired with different instance of CCN," indicates that while a user cleaning module has been deployed onto the displayed computer, a different administrator cleaning module deployed it, rather than the administrator cleaning module associated with the user interface. The state "Offline" indicates that the displayed computer is not connected to the network.

Additionally, in the example, the OS indicates the OS of the displayed computer. The user cleaning module version indicates a version of the user cleaning module deployed on the displayed computer (if a user cleaning module is deployed).

FIG. 9 illustrates another user interface of an administrator cleaning module, according to an embodiment of the invention. According to the embodiment, similar to FIG. 8, the user interface displayed in FIG. 9 is an example user interface after the administrator cleaning module has performed an automatic scan of the network, and selected one or more computers.

According to the embodiment, the user interface can display network tree 900. Network tree 900 is similar to network tree 800, but in response to an administrator "clicking" on a computer in the group "IT_DEPT," highlights the display of the computer. In the illustrated embodiment, the administrator has "clicked" the displayed computer "R203H01," and this computer is highlighted in network tree 900.

According to the embodiment, the user interface can also display computer summary 910. Computer summary 910 represents a summary of the computer selected in network tree 900. In the illustrated embodiment, computer summary displays the following information: OS, processor, RAM size, graphics processor, user cleaning module version, computer state, and hard drive(s). In the example, the processor indicates a processor utilized by the computer. The RAM size indicates a total size of RAM utilized by the computer. The graphics processor indicates a graphics processor utilized by the computer. The hard drive(s) indicate the hard drive(s) utilized by the computer. The OS, user cleaning module version and computer state are previously described in relation to FIG. 8.

According to an embodiment, an administrator can remotely deploy a user cleaning module onto a computer connected to the network, as described previously in relation to FIG. 6, using a user interface of an administrator cleaning module, such as the user interface illustrated in FIGS. 7, 8 and 9. In the embodiment, an administrator can "right click" a computer name displayed in the user interface and then "click" an icon entitled "Install client." When the user cleaning module has been successfully deployed to the computer, the user interface of the administrator cleaning module can display a notification to the administrator.

In an alternate embodiment, the administrator can remotely deploy a user cleaning module onto all the computers in a group that are connected to the network. This remote deployment can involve the remote deployment of a user cleaning module onto a computer connected to the network, as described previously in relation to FIG. 6, performed either sequentially or in parallel for all the computers of the group. This remote deployment can also be performed using a user interface of an administrator cleaning module, such as the user interface illustrated in FIGS. 7, 8 and 9. In the embodiment, the administrator can "right click" a group name displayed in the user interface and then "click" an icon entitled "Install client." When the user cleaning module has been successfully deployed to all the computers of the group, the user interface of the administrator cleaning module can display a notification to the administrator.

In an alternate embodiment, the administrator can remotely deploy a user cleaning module onto all the computers in a network. This remote deployment can involve the remote deployment of a user cleaning module onto a computer connected to the network, as described previously in relation to FIG. 6, performed either sequentially or in parallel for all the computers of the network. This remote deployment can also be performed using a user interface of an administrator cleaning module, such as the user interface illustrated in FIGS. 7, 8 and 9. In the embodiment, the administrator can "right click" an entry displayed in the user interface entitled "Network" and then "click" an icon entitled "Install client." When the user cleaning module has been successfully deployed to all the computers of the network, the user interface of the administrator cleaning module can display a notification to the administrator.

In one embodiment, an administrator can configure an automatic scan of a network by setting network scanning options using a user interface of an administrator cleaning module. According to the embodiment, the administrator can "click" on an icon entitled "Tools," displayed in the user interface (illustrated in FIGS. 7-9) and then click on a subsequent icon entitled "Options." The administrator cleaning module will then display a user interface that includes a set of configurable options. The set of configurable options can include a network scanning settings option. The network scanning settings option allows the administrator to select a network scanning technique to scan the network. For example, the network scanning settings option allows the administrator cleaning module will use a Windows® NetBIOS application programming interface to scan the network. Alternatively, the network scanning settings option can allow the administrator to select another network scanning technique known to one of ordinary skill in the art.

The set of configurable options also includes a network profile log option. A network profile log can be used to debug an automatic scan of a network. By selecting this option, the administrator cleaning module can create a network profile log that records the automatic scan of a network. The network profile log can be stored on a computer that executes the administrator cleaning module. The administrator cleaning module can also be configured to include information in the network profile regarding the result of executing a "ping" command, executing an "IPCONFIG/ALL" command, executing a "traceroute" command (also known as a "tracert" command), or a combination of the three commands.

In another embodiment, an administrator can configure a remote deployment of a user cleaning module by setting remote deployment configuration options using a user interface of an administrator cleaning module. According to the embodiment, the administrator can "click" on an icon entitled "Tools," displayed in the user interface (illustrated in FIGS. 7-9) and then click on a subsequent icon entitled "Remote Installation." The administrator cleaning module will then display a user interface that includes a set of configurable options. The set of configurable options can include an installer version option. The installer version option allows the administrator to select a version of a user cleaning installer module to remotely deploy onto a computer, as described in relation to FIG. 6. The set of configurable options can also include a paired installer option. The paired installer option allows the administrator to remotely deploy a user cleaning installer module onto a computer in addition to remotely deploying a user cleaning module. With this option, if the remote deployment of the user cleaning module fails for any reason (such as when a network security policy prevents a remote installation of the user cleaning module), the user cleaning installer module can be executed locally on the computer, and the user cleaning module can still be installed and deployed on the computer.

Figure 10:
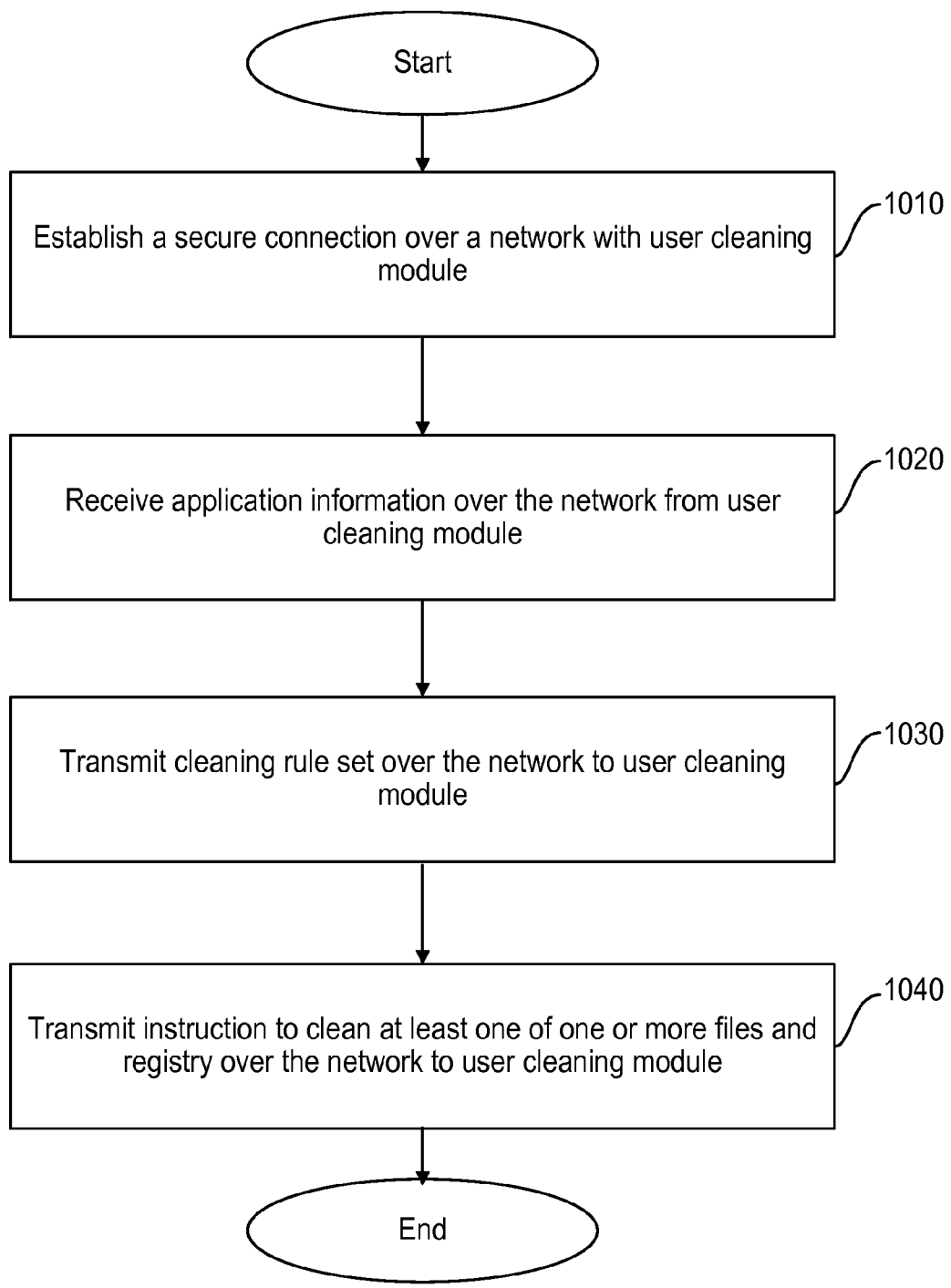
FIG. 10 illustrates another method, according to an embodiment of the invention.

FIG. 10 illustrates another method, according to an embodiment of the invention. In one embodiment, the method can be implemented by an administrator cleaning module executed on a computer. As previously described, an administrator cleaning module can remotely manage file and registry cleaning performed by one or more user cleaning modules that are remotely deployed on one or more other computers.

According to the embodiment, the method begins, and, at step 1010, a secure connection over a network with a user cleaning module, executed on another computer, is established. In one embodiment, the administrator cleaning module generates a first random 128-bit value and transmits it to the user cleaning module. The administrator cleaning module then receives a second random 128-bit value that is encrypted with a Rivest, Shamir, and Adleman (RSA) public key that is known to both the administrator cleaning module and the user cleaning module. The administrator cleaning module subsequently decrypts the second random 128-bit value using the RSA public key. The administrator cleaning module then computes a main encryption key based on the first random 128-bit value and the second random 128-bit value. The user cleaning module can also compute the main encryption key based on the first random 128-bit value and the second random 128-bit value. All subsequent communication with the user cleaning module is encrypted using the main encryption key, thus establishing a secure connection. The secure connection can utilize a user datagram protocol (UDP). The method then proceeds to step 1020.

At step 1020, application information is received over the network from the user cleaning module. According to the embodiment, the application information includes an application list that represents one or more applications that are installed on the other computer. The method then proceeds to step 1030.

At step 1030, a cleaning rule set is transmitted over the network to the user cleaning module, where the cleaning rule set is based on the application information. According to the embodiment, the cleaning rule set includes one or more cleaning rule identities. A cleaning rule identity is an identity that uniquely identifies a cleaning rule. Thus, each cleaning rule identity of the cleaning rule set corresponds to a unique cleaning rule. A cleaning rule includes one or more parameters for cleaning at least one of one or more files and a registry of the other computer. Thus, according to the embodiment, a composition of cleaning rule identities that make up the cleaning rule set can be based, in part, by the one or more applications of the application information. According to an embodiment, each cleaning rule identity of the cleaning rule set corresponds to either a system cleaning rule, an application cleaning rule, or a registry cleaning rule. The method then proceeds to step 1040.

At step 1040, an instruction to clean at least one of one or more files and a registry is transmitted over the network to the user cleaning module, where the instruction is based on the cleaning rule set. According to the embodiment, the instruction instructs the user cleaning module, for each cleaning rule identity of the cleaning rule set, to apply a cleaning rule that corresponds to the cleaning rule identity. By instructing the user cleaning module to apply a cleaning rule, the instruction instructs the user cleaning module to perform at least one of the following: removing one or more files; removing data from one or more files; removing one or more registry entries; and removing data from one or more registry entries. Thus, the instruction can instruct the user cleaning module to perform file cleaning, registry cleaning, or a combination of the two. In an alternate embodiment, an instruction to analyze, rather than clean, at least one of one or more files and a registry is transmitted over the network to the user cleaning module, where the instruction is based on the cleaning rule set. In the alternate embodiment, the instruction instructs the user cleaning module, for each cleaning rule identity of the cleaning rule set, to apply a cleaning rule that corresponds to the cleaning rule identity. By instructing the user cleaning module to apply a cleaning rule, the instruction instructs the user cleaning module to perform at least one of the following: identifying one or more files to be removed; identifying data from one or more files to be removed; identifying one or more registry entries to be removed; and identifying data from one or more registry entries to be removed. After step 1040, the method ends.

Figure 11:
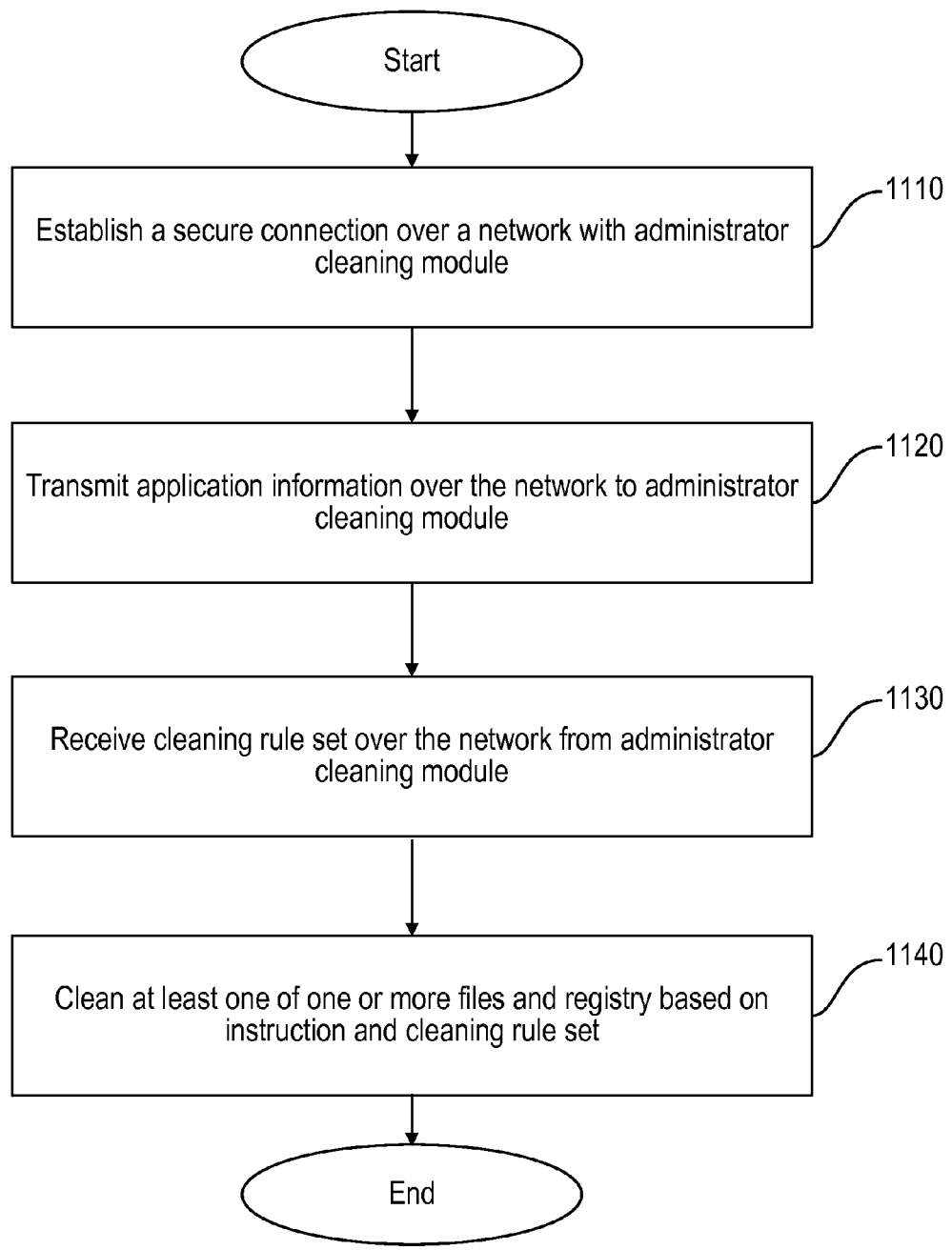
FIG. 11 illustrates another method, according to an embodiment of the invention.

FIG. 11 illustrates another method, according to an embodiment of the invention. In one embodiment, the method can be implemented by a user cleaning module executed on a computer. As previously described, a user cleaning module can perform file and registry cleaning on the computer, where the file and registry cleaning can be remotely managed by an administrator cleaning module.

According to the embodiment, the method begins, and, at step 1110, a secure connection over a network with an administrator cleaning module, executed on another computer, is established. In one embodiment, the user cleaning module receives a first random 128-bit value from the administrator cleaning module. The user cleaning module then generates a second random 128-bit value and encrypts it with a RSA public key that is known to both the user cleaning module and the administrator cleaning module. The user cleaning module subsequently transmits the encrypted second random 128-bit value to the administrator cleaning module. The user cleaning module then computes a main encryption key based on the first random 128-bit value and the second random 128-bit value. The administrator cleaning module can also compute the main encryption key based on the first random 128-bit value and the second random 128-bit value. All subsequent communication with the administrator cleaning module is encrypted using the main encryption key, thus establishing a secure connection. The secure connection can utilize a UDP. The method then proceeds to step 1120.

At step 1120, application information is transmitted over the network to the administrator cleaning module. According to the embodiment, the application information includes an application list that represents one or more applications that are installed on the computer. The method then proceeds to step 1130.

At step 1130, a cleaning rule set is received over the network from the administrator cleaning module, where the cleaning rule set is based on the application information. According to the embodiment, the cleaning rule set includes one or more cleaning rule identities. A cleaning rule identity is an identity that uniquely identifies a cleaning rule. Thus, each cleaning rule identity of the cleaning rule set corresponds to a unique cleaning rule. A cleaning rule includes one or more parameters for cleaning at least one of one or more files and a registry of the other computer. Thus, according to the embodiment, a composition of cleaning rule identities that make up the cleaning rule set can be based, in part, by the one or more applications of the application information. According to an embodiment, each cleaning rule identity of the cleaning rule set corresponds to either a system cleaning rule, an application cleaning rule, or a registry cleaning rule. The method then proceeds to step 1140.

At step 1140, at least one of one or more files and a registry of the computer are cleaned. Thus, file cleaning can be performed, registry cleaning can be performed, or a combination of the two can be performed. The cleaning is based on an instruction and the cleaning rule set received from the administrator cleaning module. According to the embodiment, for each cleaning rule identity of the cleaning rule set, a cleaning rule that corresponds to the cleaning rule identity is applied. By applying a cleaning rule, at least one of the following is performed: removing one or more files; removing data from one or more files; removing one or more registry entries; and removing data from one or more registry entries. In an alternate embodiment, at least one of one or more files and a registry of the computer are analyzed, rather than cleaned. According to the alternate embodiment, for each cleaning rule identity of the cleaning rule set, a cleaning rule that corresponds to the cleaning rule identity is applied. By applying a cleaning rule, at least one of the following is performed: identifying one or more files to be removed; identifying data from one or more files to be removed; identifying one or more registry entries to be removed; and identifying data from one or more registry entries to be removed. After step 1140, the method ends.

Figure 12:
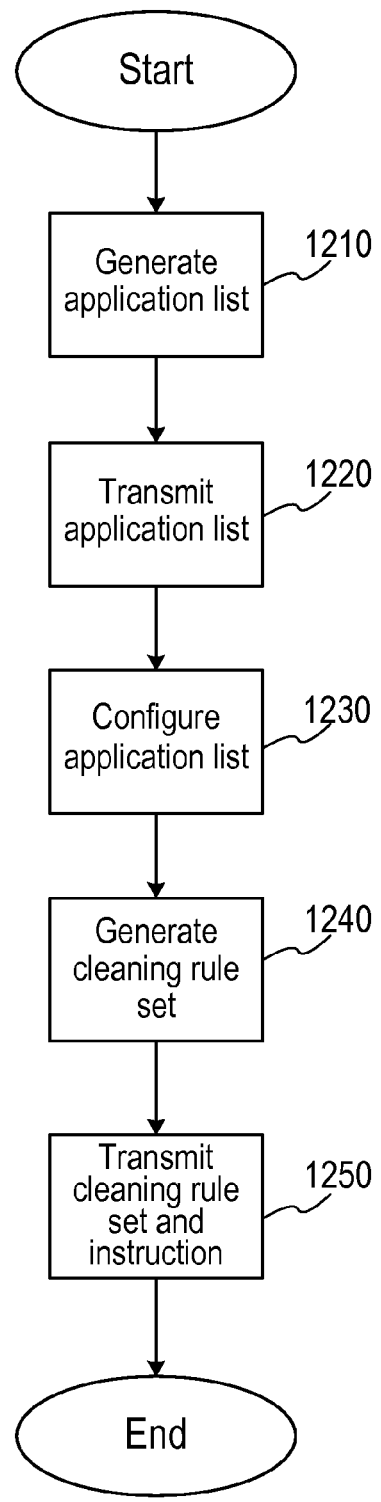
FIG. 12 illustrates a flow diagram of a method for instructing a user cleaning module to clean at least one of one or more files and a registry of a computer, according to an embodiment of the invention.

FIG. 12 illustrates a flow diagram of a method for instructing a user cleaning module to clean at least one of one or more files and a registry of a computer, according to an embodiment of the invention. According to the embodiment, the following steps can be part of a method for cleaning at least one of one or more files and a registry of a computer over a network.

In the embodiment, the flow begins, and, at step 1210, the user cleaning module generates an application list. According to the embodiment, the application list represents a list of applications that are installed on a computer, that the user cleaning module is executed on. In one embodiment, the user cleaning module generates the application list by determining whether one or more applications are installed on the computer. According to the embodiment, the user cleaning module can include a list of applications that are commonly installed on a computer, such as Microsoft® Internet Explorer®, Mozilla® Firefox®, Apple® Safari®, and Google® Chrome®. The user cleaning module can also include a list of locations on the computer that the user cleaning module can analyze to determine whether such an application is installed. In one embodiment, the list of locations includes a list of file locations. In another embodiment, the list of locations includes a list of registry entries. In yet another embodiment, the list of locations includes a combination of both a list of file locations and a list of registry entries. According to the embodiment, if the user cleaning module determines that an application is installed, the user cleaning module can include that application in the application list. If the user cleaning module determines that the application is not installed, the user cleaning module does not include that application in the application list. The flow then proceeds to step 1220.

At step 1220, the user cleaning module transmits the application list over the network to the administrator cleaning module. According to the embodiment, the application list can be used by the administrator cleaning module to generate a cleaning rule set. A cleaning rule set includes one or more cleaning rule identities, where each cleaning rule identity corresponds to a unique cleaning rule. A cleaning rule set can be stored within an administrator cleaning module. A cleaning rule is a set of one or more parameters for cleaning at least one of one or more files and a registry of a computer. More specifically, a cleaning rule is a set of one or more parameters for at least one of the following: removing one or more files from a computer, removing data from one or more files, removing one or more registry entries from a computer, and removing data from one or more registry entries. The parameters of the cleaning rule instruct a user cleaning module on what items to remove when applying the cleaning rule, where the items can include files, registry entries, data from files, data from registry entries, or a combination therein. A cleaning rule can be stored within a user cleaning module. The flow then proceeds to step 1230.

At step 1230, the administrator cleaning module configures the application list transmitted by the user cleaning module. According to the embodiment, the administrator cleaning module can select which applications from the application list are to be cleaned, and which applications from the application list are not to be cleaned. Furthermore, regarding the applications that are to be cleaned, the administrator cleaning module can configure which items corresponding to the application are to be removed, where the items can include files, registry entries, data from files, data from registry entries, or a combination therein. In one embodiment, the administrator cleaning module can display the application list (and corresponding configuration options) in a user interface, and allow an administrator to configure the application list accordingly. The flow then proceeds to step 1240.

At step 1240, the administrator cleaning module generates a cleaning rule set. As previously described, a cleaning rule set includes one or more cleaning rule identities, where each cleaning rule identity corresponds to a unique cleaning rule. As also previously described, a composition of cleaning rule identities that make up the cleaning rule set can be based, in part, by the one or more applications of the configured application list. Thus, according to the embodiment, one or more cleaning rule identities that correspond to application cleaning rules can be generated based on the configured application list. In addition, one or more cleaning rule identities that correspond to system cleaning rules can also be generated. The distinction between application cleaning rules and system cleaning rules is described below in greater detail in relation to FIG. 13. In one embodiment, the administrator cleaning module can display the application cleaning rule set in a user interface, and allow an administrator to configure the cleaning rule set accordingly. The flow then proceeds to step 1250.

At step 1250, the administrator cleaning module transmits the cleaning rule set, and an instruction to clean at least one of one or more files and a registry based on the cleaning rule set, over the network to the user cleaning module. As will be described in greater detail in relation to FIG. 13, the user cleaning module can apply one or more cleaning rules, based on the cleaning rule set and the instruction, and clean at least one of one or more files and a registry on the computer that executes the user cleaning module. In an alternate embodiment, the administrator cleaning module can also transmit a list of users, in addition to the cleaning rule set and the instruction, to the user cleaning module. According to the alternate embodiment, the user cleaning module can apply the one or more cleaning rules for only the users of the computer in the list of users, rather than for the entire computer. In an alternate embodiment, the administrator cleaning module can transmit an instruction to analyze, rather than clean, at least one of one or more files and a registry based on the cleaning rule set, over the network to the user cleaning module. As will also be discussed in greater detail in relation FIG. 13, the user cleaning module can apply one or more cleaning rules, based on the cleaning rule set and the instruction, and analyze at least one of one or more files and a registry on the computer that executes the user cleaning module. After step 1250, the flow ends.

Figure 13:
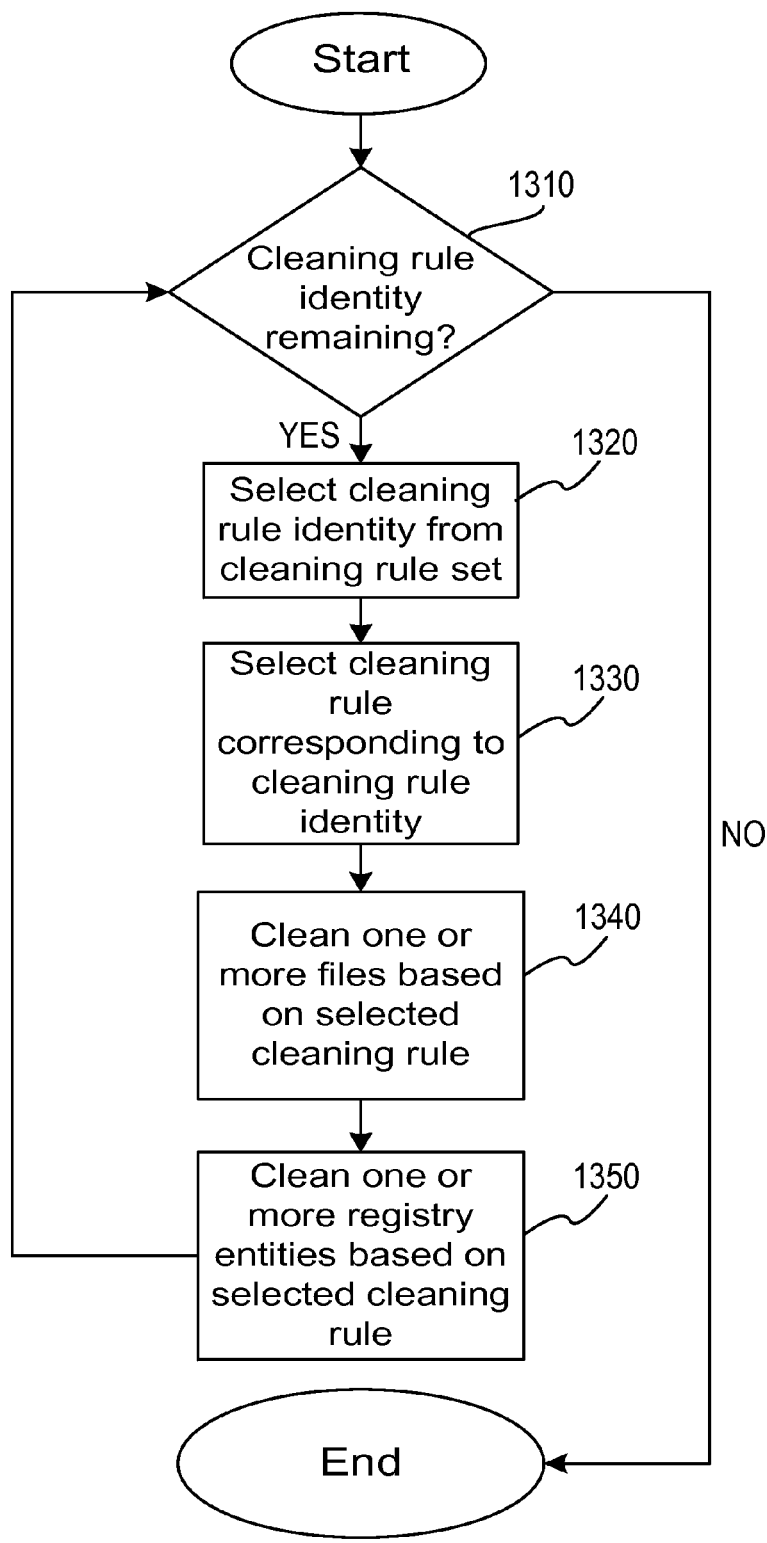
FIG. 13 illustrates a flow diagram of a method for cleaning at least one of one or more files and a registry of a computer, according to an embodiment of the invention.

FIG. 13 illustrates a flow diagram of a method for cleaning at least one of one or more files and a registry of a computer, according to an embodiment of the invention. According to the embodiment, the following steps can be part of a method for cleaning at least one of one or more files and a registry of a computer over a network.

In the embodiment, the flow begins, and, at step 1310, a user cleaning module determines whether a received cleaning rule set includes any cleaning rule identities that have not yet been applied. According to the embodiment, the cleaning rule set is received from an administrator cleaning module over a network. As previously described, a cleaning rule identity corresponds to a unique cleaning rule that can be stored within the user cleaning module. If the cleaning rule set includes any cleaning rule identities that have not been applied, the flow proceeds to step 1320. If the cleaning rule set does not include any cleaning rule identities that have not been applied, the flow skips steps 1320, 1330, 1340, and 1350, and the flow ends.

At step 1320, the user cleaning module selects a cleaning rule identity from the cleaning rule set. According to the embodiment, the user cleaning module selects a cleaning rule identity that has not been previously selected. The flow then proceeds to step 1330.

At step 1330, the user cleaning module selects a cleaning rule that corresponds to the selected cleaning rule identity. As previously discussed, a cleaning rule is a set of one or more parameters for cleaning at least one of one or more files and a registry of a computer, and the cleaning rule can be stored within the user cleaning module. According to the embodiment, the cleaning rule identity indicates which cleaning rule to apply to the computer where the user cleaning module is executed. The cleaning rule can include one or more parameters for at least one of the following: removing one or more files from a computer, removing data from one or more files, removing one or more registry entries from a computer, and removing data from one or more registry entries. The flow then proceeds to step 1340.

At step 1340, the user cleaning module cleans one or more files based on the selected cleaning rule. According to the embodiment, when the selected cleaning rule applies to one or more files stored on the computer, the user cleaning module, for each file of the one or more files, removes the file from the computer or removes data from the file, based on the selected cleaning rule. This step can be skipped if the selected cleaning rule is not applied to any files stored on the computer. In an alternate embodiment, the user cleaning module can analyze, rather than clean, one or more files based on the selected cleaning rule. According to the alternate embodiment, the user cleaning module identifies the one or more files for removal or data removal based on the cleaning rule. The flow then proceeds to step 1350.

At step 1350, the user cleaning module cleans one or more registry entries based on the selected cleaning rule. According to the embodiment, when the selected cleaning rule applies to one or more registry entries stored on the computer, the user cleaning module, for each registry entry of the one or more registry entries, removes the registry entry from the computer or removes data from the registry entry, based on the selected cleaning rule. This step can be skipped if the selected cleaning rule is not applied to any registry entries stored on the computer. In an alternate embodiment, the user cleaning module can analyze, rather than clean, one or more registry entries based on the selected cleaning rule. According to the alternate embodiment, the user cleaning module identifies the one or more registry entries for removal or data removal based on the cleaning rule. The flow then returns to step 1310, where the user cleaning module again determines whether a received cleaning rule set includes any cleaning rule identities that have not been applied. Thus, according to the embodiment, steps 1320, 1330, 1340, and 1350 will be repeated for each cleaning rule identity of the cleaning rule set.

According to an embodiment, a cleaning rule can be one of three types of cleaning rules: a system cleaning rule that can be applied to clean at least one of one or more files and one or more registry entries; an application cleaning rule that can be applied to clean at least one of one or more files and one or more registry entries; and a registry cleaning rule that can be applied to clean one or more registry entities.

A system cleaning rule is a cleaning rule for the cleaning of at least one of one or more files, and one or more registry entries, corresponding to a system component of a computer, rather than a specific application. According to one embodiment, examples of system components include the following components: Recycle Bin, Temporary Files, Clipboard, Memory Dumps, Chkdsk File Fragments, Windows Log Files, Windows Error Reporting, DNS Cache, FTP Accounts, Start Menu Shortcuts, and Desktop Shortcuts. One of ordinary skill in the art would readily appreciate that these components are merely example components, and a system cleaning rule can clean other system components of a computer.

According to an embodiment, the following is an example system cleaning rule for cleaning the Windows Log Files component:

| [Windows Log Files] |
| --- |
| ID=1017 |
| LangSecRef=3003 |
| LangRef=3145 |
| Default=True |
| FileKey1=%SystemDirectory%\wbem\Logs\|*.log |
| FileKey2=%SystemDirectory%\wbem\Logs\|*.lo_ |
| FileKey3=%windir%\|*.log |
| FileKey4=%windir%\|*.bak |
| FileKey5=%windir%\|*log.txt |
| FileKey6=%commonappdata%\Microsoft\Dr Watson\|*.log |
| FileKey7=%commonappdata%\Microsoft\Dr Watson\|*.dmp |
| FileKey8=%windir%\Debug\|*.log |
| FileKey9=%windir%\Debug\UserMode\|*.log |
| FileKey10=%windir%\Debug\UserMode\|*.bak |
| FileKey11=%windir%\ScheduLgU.txt |
| FileKey12=%windir%\security\logs\|*.log |
| FileKey13=%windir%\security\logs\|*.old |

According to the embodiment, the system cleaning rule includes an ID parameter, whose value represents a cleaning rule identity. The system cleaning rule also includes a Lang- SecRef parameter and a LangRef parameter, whose values represent a system component or application to be cleaned. In addition, the system cleaning rule includes a Default parameter, whose value indicates whether the cleaning rule is applied as a default. The system cleaning rule also includes the following parameters: FileKey1, FileKey2, FileKey3, FileKey4, FileKey5, FileKey6, FileKey7, FileKey8, FileKey9, FileKey10, FileKey11, FileKey12, and FileKey13. Each of these parameters are examples of a FileKey parameter. A FileKey parameter indicates specific files that are cleaned when the cleaning rule is applied.

In an alternate embodiment, a system cleaning rule can include a DetectFile parameter, a Detect parameter, or a combination of the two. The DetectFile parameter can be used to detect the presence of a system component or application by looking for specific files. The Detect parameter can be used to detect the presence of a system component or application by looking for specific registry entries. In the alternate embodiment, a system cleaning rule can also include any number of RegKey parameters. A RegKey parameter indicates specific registry entries that are cleaned when the cleaning rule is applied.

One of ordinary skill in the art would readily appreciate that the system cleaning rule shown above is only an example, and that a system cleaning rule may take different forms and still be within the scope of the invention.

An application cleaning rule is a cleaning rule for the cleaning of at least one of one or more files, and one or more registry entries, corresponding to a specific application of a computer. According to one embodiment, examples of applications include the following applications: Mozilla® Firefox®, Opera®, Apple® Safari®, Google® Chrome®, Adobe® Acrobat Reader®, Adobe® ImageReady®, Adobe® Photoshop®, Adobe® Illustrator®, Yahoo® Toolbar, Windows Live® Toolbar, Google® Toolbar, Google® Deskbar®, Google® Calendar Sync®, Google® Talk®, Microsoft® Windows Media Player®, Real® Player, Quicktime® Player, Adobe® Paint Shop Pro®, Microsoft® Works®, Microsoft® Office®, Installshield® Developer®, Macromedia® Flash®, Adobe® Flash Player®, Macromedia® Homesite®, Macromedia® Fireworks®, Macromedia® Dreamweaver®, Macromedia® Shockwave®, and Microsoft® Silverlight®. One of ordinary skill in the art would readily appreciate that these applications are merely example components, and an application cleaning rule can clean other applications of a computer.

According to an embodiment, the following is an example application cleaning rule for cleaning an Internet cache of Mozilla® Firefox®:

---

[Mozilla - Internet Cache]

ID=2001
LangSecRef=3026
Default=True
SpecialDetect=DET_MOZILLA
SpecialKey1=N_MOZ_CACHE

---

According to the embodiment, the application cleaning rule includes an ID parameter, whose value represents a cleaning rule identity. The application cleaning rule also includes a LangSecRef parameter, whose values represent a system component to be cleaned. In addition, the application cleaning rule includes a Default parameter, whose value indicates whether the application cleaning rule is applied as a default. The application cleaning rule also includes the following parameters: SpecialDetect and SpecialKey1. The values for the parameters SpecialDetect and SpecialKey1 represent dedicated functions that are used to detect applications or system components and clean them.

In an alternate embodiment, an application cleaning rule can include a DetectFile parameter, a Detect parameter, or a combination of the two, which have previously been described. In the alternate embodiment, an application cleaning rule can also include any number of FileKey parameters and/or RegKey parameters, both of which have also previously been described.

One of ordinary skill in the art would readily appreciate that the application cleaning rule shown above is only an example, and that an application cleaning rule may take different forms and still be within the scope of the invention.

A registry cleaning rule is a cleaning rule for the cleaning one or more registry entries of a computer. According to one embodiment, examples of registry cleaning rules include the following examples:

Missing Shared Dynamically Linked Libraries (DLLs)—Removes entry for a library which is shared by multiple programs that no longer exist;

Unused File Extensions—Removes entries for file extensions that are no longer associated with installed applications;

ActiveX and Class Issues—Removes invalid entries from COM/ActiveX object that refer to a non-existing file;

Type Libraries—Removes invalid entries for type library that refer to an non-existing file;

Applications—Removes invalid entries for non-existent programs;

Fonts—Removes invalid entries for fonts that no longer exist in a Windows Fonts folder;

Application Paths—Removes entries for registered application path that no longer exists;

Help Files—Removes entries referring to Help files that no longer exist;

Installer—Removes unnecessary uninstallers or the remnants of previous uninstallations;

Obsolete Software—Removes entries for applications that are no longer installed;

Run At Startup—Removes entries for Startup applications that no longer exist;

Start Menu Ordering—Removes entries for Start menu application that no longer exist; and MUI Cache—Removes invalid entries from a chance of recently run programs.

One of ordinary skill in the art would readily appreciate that these are merely example registry cleaning rules, and that other registry cleaning rules can be included. According to an embodiment, the following is an example registry cleaning rule for cleaning missing shared DLLs:

---

[Missing Shared DLLs]

LangSecRef=3501
LangRef=3601
Default=True
SpecialKey1=R_SHARED_DLLS

---

According to the embodiment, the registry cleaning rule includes an ID parameter, whose value represents a cleaning rule identity. The registry cleaning rule also includes a LangSecRef parameter and a LangRef parameter, whose values represent one or more registry entries to be cleaned. In addition, the registry cleaning rule includes a Default parameter, whose value indicates whether the registry cleaning rule is applied as a default. The application cleaning rule also includes a SpecialKey1 parameter, whose value represents a dedicated function that is used to detect registry entries and clean them.

In an alternate embodiment, a registry cleaning rule can include a Detect parameter, which has previously been described. In the alternate embodiment, an application cleaning rule can also include any number of RegKey parameters, which also have previously been described.

One of ordinary skill in the art would readily appreciate that the registry cleaning rule shown above is only an example, and that a registry cleaning rule may take different forms and still be within the scope of the invention.

According to an alternate embodiment, an administrator cleaning module can also transmit an instruction over the network to the user cleaning module to clean one or more databases of a computer where the user cleaning module is executed, where the instruction is based on the cleaning rule set. According to the alternate embodiment, the instruction instructs the user cleaning module, for each appropriate cleaning rule identity of the cleaning rule set, to apply a cleaning rule that corresponds to the cleaning rule identity, to perform database cleaning, database optimization, database compacting, or a combination therein, on the one or more databases. As understood by one of ordinary skill in the art, database cleaning refers to removing one or more database records from one or more database tables. The one or more database records can be removed because of various technical or business reasons. For example, the data in the one or more database records may be incomplete or corrupt. As another example, the one or more database records may not be utilized. Database optimization refers to improving speed and functionality of querying the one or more databases, such as creating or modifying one or more indexes. Database compacting refers to compacting data stored in the one or more databases, so that the one or more databases require a smaller amount of storage space on the computer.

According to the alternate embodiment, a user cleaning module can clean one or more databases of a computer where the user cleaning module is executed. The one or more databases can be cleaned based on an instruction and the cleaning rule set received from the administrator cleaning module. According to the embodiment, for each appropriate cleaning rule identity of the cleaning rule set, a cleaning rule that corresponds to the cleaning rule identity is applied to perform database cleaning, database optimization, database compacting, or a combination therein, on the one or more databases. When the cleaning rule performs database cleaning, the cleaning rule can remove one or more database records from one or more database tables of the one or more databases. When the cleaning rule perform database optimization, the cleaning rule can create or modify one or more indexes that can be associated with the one or more databases. When the cleaning rule performs database compacting, the cleaning rule can compact the data stored in the one or more databases so that the one or more databases require a smaller amount of storage space on the computer.

According to another alternate embodiment, an administrator cleaning module can also transmit an instruction over the network to the user cleaning module to optimize one or more browser applications of a computer where the user cleaning module is executed, where the instruction is based on the cleaning rule set. A browser application is an application configured to retrieve, present, and traverse information resources over the Internet, such as the World Wide Web. Examples of a browser application include Microsoft® Internet Explorer®, Mozilla® Firefox®, Apple® Safari®, and Google® Chrome®. Optimizing a browser application can include cleaning one or more files associated with the browser application, cleaning one or more registry entries associated with the browser application, cleaning one or more databases associated with the browser application, or a combination therein, as previously described.

According to the alternate embodiment, a user cleaning module can optimize one or more browser applications of a computer where the user cleaning module is executed. The one or more browser applications can be optimized based on an instruction and the cleaning rule set received from the administrator cleaning module. Upon receiving the instruction and the cleaning rule set from the administrator cleaning module, the user cleaning module can clean one or more files associated with each browser application, clean one or more registry entries associated with each browser application, clean one or more databases associated with each browser application, or a combination therein, as previously described.

Figure 14:
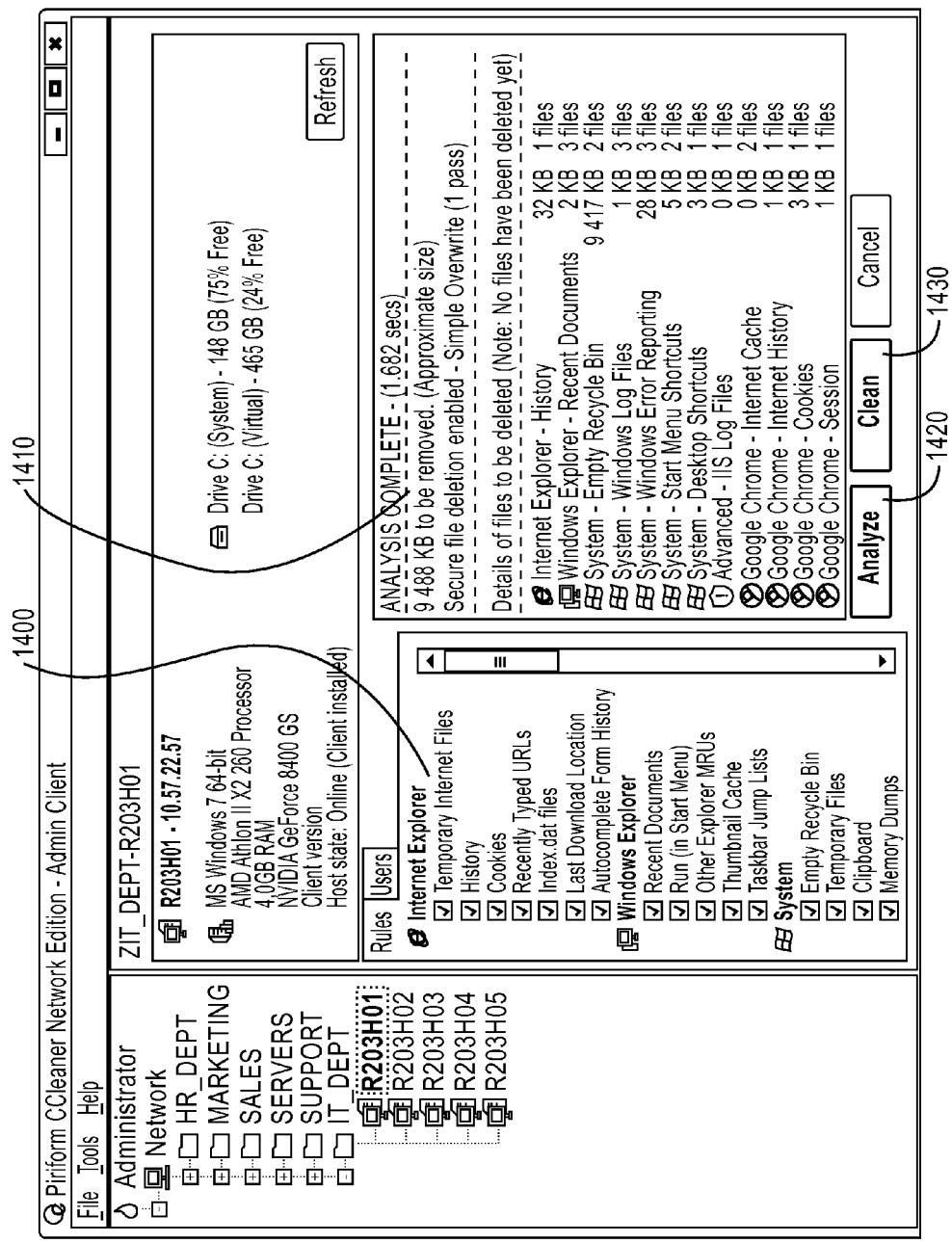
FIG. 14 illustrates another user interface of an administrator cleaning module, according to an embodiment of the invention.
Figure 15:
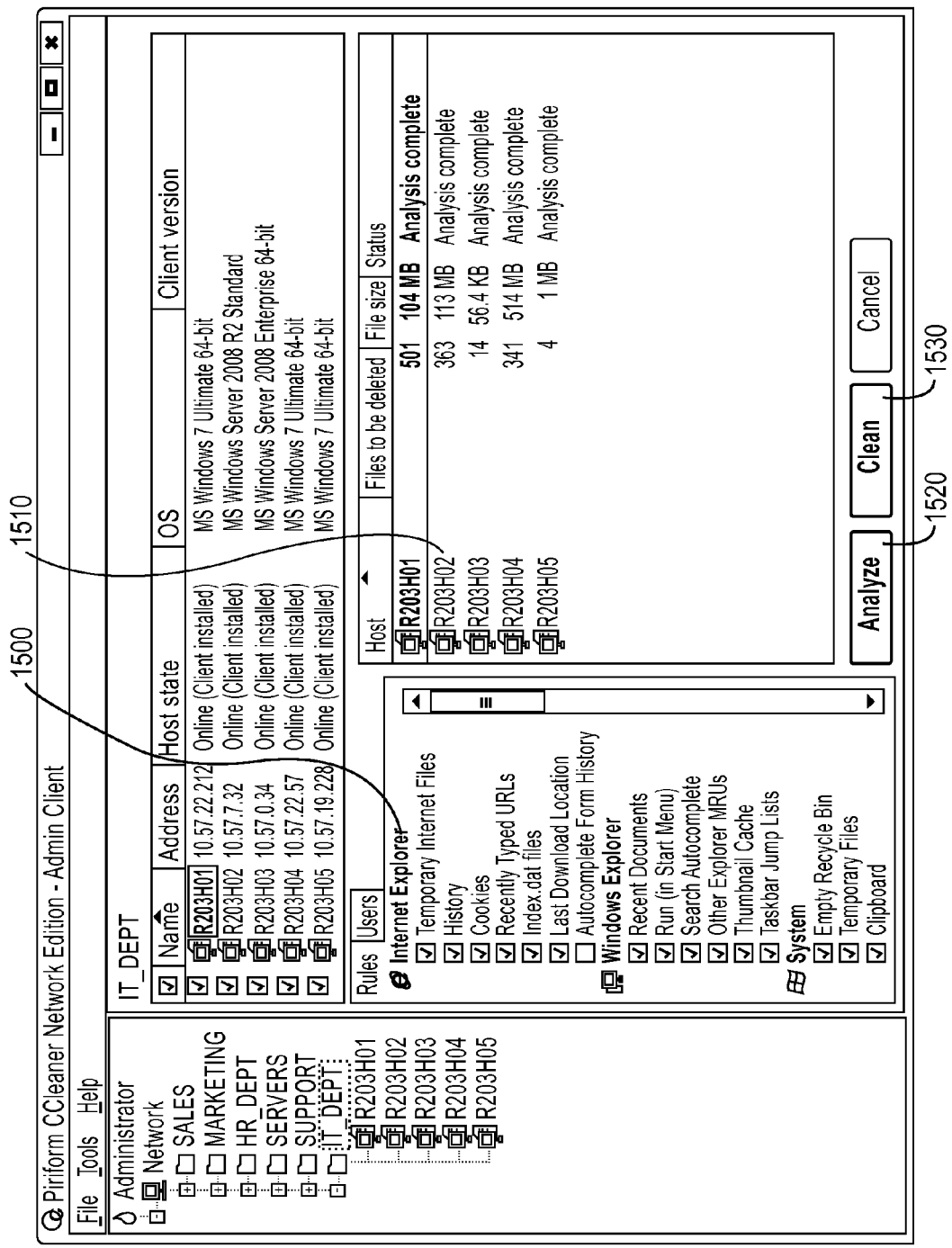
FIG. 15 illustrates another user interface of an administrator cleaning module, according to an embodiment of the invention.

FIGS. 14-15 illustrate a user interface that can be created by an administrator cleaning module, executed on a computer, where the user interface is displayed to an administrator at a screen of the computer. However, as one of ordinary skill in the art would readily appreciate, the user interface illustrated in FIGS. 14-15 is merely an example user interface according to an embodiment of the invention. In alternate embodiments, the administrator cleaning module may display a user interface that has a different appearance from the user interface illustrated in FIGS. 14-15. In one embodiment, the user interface can be a separate web service that can be executed by the administrator cleaning module, where the administrator cleaning module is executed on the computer. In another embodiment, the user interface can be a separate API that can be executed by the administrator cleaning module, where the administrator cleaning module is executed on the computer. Furthermore, in alternate embodiments, the administrator cleaning module may not display a user interface to an administrator. In some of these embodiments, an administrator interfaces with the administrator cleaning module using a web interface. The web interface can be located at the same computer of the administrator cleaning module, or a separate computer, depending on the embodiment. In other alternate embodiments, there is no user interface associated with the administrator cleaning module, whatsoever.

FIG. 14 illustrates another user interface of an administrator cleaning module, according to an embodiment of the invention. According to the embodiment, the user interface displayed in FIG. 14 is an example user interface that can be displayed before the administrator cleaning module has instructed a user cleaning module that is deployed onto a computer to clean one or more files and a registry of the computer.

According to the embodiment, the user interface can display cleaning rule set 1400. Cleaning rule set 1400 is a visual representation of a cleaning rule set that can be transmitted to a user cleaning module, where the cleaning rule set comprises one or more cleaning rule identities, where each cleaning rule identity corresponds to a unique cleaning rule. The user interface can allow an administrator to configure the cleaning rule set by "clicking" on icons that are displayed next to a displayed name of the cleaning rule. By "clicking" on each icon, the user can either add or remove the cleaning rule identity that corresponds to the displayed name of the cleaning rule to or from the cleaning rule set. In an embodiment, cleaning rule set 1400 also includes a tab entitled "Users." According to the embodiment, an administrator can "click" on the tab entitled "Users" and can configure a list of users that is transmitted to the user cleaning module, so that the user cleaning module can apply one or more cleaning rules for only the users of the computer in the list of users, rather than for the entire computer.

In accordance with the embodiment, the user interface can also display computer summary 1410. Computer summary 1410 represents a summary of a computer selected in the user interface. If the administrator cleaning module has previously transmitted an instruction to a user cleaning module that is deployed on the computer to analyze at least one of one or more files, and one or more registry entries, computer summary 1410 displays information regarding the one or more items identified for removal, where the items can include one or more files, one or more registry entries, or a combination of the two. If the administrator cleaning module has previously transmitted an instruction to a user cleaning module that is deployed on the computer to clean at least one of one or more files, and one or more registry entries, computer summary 1410 displays information regarding the items cleaned, where the items can include one or more files, one or more registry entries, or a combination of the two.

According to the embodiment, to transmit an instruction to analyze at least one of one or more files, and one or more registry entries, to a user cleaning module that is deployed on the computer selected in the user interface, an administrator can "click" analyze button 1420. To transmit an instruction to clean at least one of one or more files, and one or more registry entries, to the user cleaning module that is deployed on the computer selected in the user interface, the administrator can "click" clean button 1430.

FIG. 15 illustrates another user interface of an administrator cleaning module, according to an embodiment of the invention. According to the embodiment, the user interface displayed in FIG. 15 is an example user interface that can be displayed before the administrator cleaning module has instructed a plurality of user cleaning modules that are deployed onto a plurality of computers in a group to clean at least one of one or more files and a registry of the plurality of computers.

According to the embodiment, the user interface can display cleaning rule set 1500. Cleaning rule set 1500 is identical to cleaning rule set 1400 illustrated in FIG. 14.

In accordance with the embodiment, the user interface can also display group summary 1510. Group summary 1510 represents a summary of the computers associated with a group selected in the user interface. If the administrator cleaning module has previously transmitted an instruction to a user cleaning module that is deployed on the computers of the group to analyze at least one of one or more files, and one or more registry entries, group summary 1510 displays information regarding the items identified for removal, for each computer of the group, where the items can include one or more files, one or more registry entries, or a combination of the two. If the administrator cleaning module has previously transmitted an instruction to a user cleaning module that is deployed on the computers of the group to clean at least one of one or more files, and one or more registry entries, group summary 1510 displays information regarding the items cleaned, for each computer of the group, where the items can include one or more files, one or more registry entries, or a combination of the two.

According to the embodiment, to transmit an instruction to analyze at least one of one or more files, and one or more registry entries, to a user cleaning module that is deployed on all the computers associated with the group selected in the user interface, an administrator can "click" analyze button 1520. To transmit an instruction to clean at least one of one or more files, and one or more registry entries, to the user cleaning module that is deployed on all the computers associated with the group selected in the user interface, the administrator can "click" clean button 1530.

According to an embodiment, an administrator can remotely deploy a cleaning application to one or more computers over a network from a central location. Furthermore, the administrator can execute the cleaning application as necessary on some or all the computers, and can update the cleaning application from a central location. Finally, an administrator can organize the computers into one or more groups, and can execute the cleaning application with a different rule set for each group, or each computer within a group.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
   automatically scanning, by an administrator cleaning module executed on a computer, a network to detect computers;
   selecting, by the administrator cleaning module, one or more computers from a list of computers detected on the network, the list of computers being associated with a network summary, and the network summary comprising a number of computers in the network and a number of user cleaning module licenses; and
   remotely deploying, by the administrator cleaning module, a user cleaning module over the network to the selected one or more computers.

2. The method of claim 1, wherein the automatically scanning the network for computers further comprises using a NetBIOS application programming interface to identify one or more computers connected to the network that have registered at least one of a NetBIOS name, and a NetBIOS group name.

3. The method of claim 1, further comprising uninstalling a previous user cleaning module that is already deployed on the selected one or more computers, before remotely deploying the user cleaning module.

4. The method of claim 1, wherein the user cleaning module is configured to clean at least one of one or more files and a registry of the selected one or more computers.

5. The method of claim 4, wherein the user cleaning module comprises one or more cleaning rules, and wherein each cleaning rule of the one or more cleaning rules comprises a set of one or more parameters for cleaning at least one of one or more files and a registry of the selected one or more computers.

6. The method of claim 1, further comprising creating a user interface and displaying the user interface at a screen of the computer, wherein the user interface comprises one of a web service and an application programming interface.

7. An apparatus, comprising:
   a memory configured to store an administrator cleaning module; and
   a processor configured to execute the administrator cleaning module stored on the memory, wherein the processor is further configured, when executing the administrator cleaning module stored on the memory, to, automatically scan a network to detect computers;

select one or more computers from a list of computers detected on the network, the list of computers being associated with a network summary, and the network summary comprising a number of computers and a number of user cleaning module licenses; and remotely deploy a user cleaning module over the network to the selected one or more computers.

8. The apparatus of claim 7, wherein the processor is further configured, when executing the administrator cleaning module stored on the memory, to use a NetBIOS application programming interface to identify one or more computers connected to the network that have registered at least one of a NetBIOS name, and a NetBIOS group name.

9. The apparatus of claim 7, wherein the processor is further configured, when executing the administrator cleaning module stored on the memory, to uninstall a previous user cleaning module that is already deployed on the selected one or more computers, before remotely deploying the user cleaning module.

10. The apparatus of claim 7, wherein the user cleaning module is configured to clean at least one of one or more files and a registry of the selected one or more computers.

11. The apparatus of claim 10, wherein the user cleaning module comprises one or more cleaning rules, and wherein each cleaning rule of the one or more cleaning rules comprises a set of one or more parameters for cleaning at least one of one or more files and a registry of the selected one or more computers.

12. A computer-readable medium having a computer program stored thereon that, when executed by a processor, causes the processor to implement a method, the method comprising:

automatically scanning a network to detect computers;

selecting one or more computers from a list of computers detected on the network, the list of computers being associated with a network summary, and the network summary comprising a number of computers in the network and a number of user cleaning module licenses; and remotely deploying a user cleaning module over the network to the selected one or more computers.

13. A method, comprising:

establishing, by an administrator cleaning module executed on a first computer, a secure connection over a network with a user cleaning module executed on a second computer, the second computer being associated with a network summary, and the network summary comprising a number of computers in the network and a number of user cleaning module licenses;

receiving, by the administrator cleaning module, application information over the network from the user cleaning module;

transmitting, by the administrator cleaning module, a cleaning rule set over the network to the user cleaning module, wherein the cleaning rule set is based on the application information; and transmitting, by the administrator cleaning module, an instruction to clean at least one of one or more files or a registry of the second computer over the network to the user cleaning module, wherein the instruction is based on the cleaning rule set.

14. The method of claim 13, wherein the establishing the secure connection over the network further comprises generating a main encryption key used to encrypt communications over the secure connection, and wherein the secure connection comprises a user datagram protocol.

15. The method of claim 13, wherein the application information comprises an application list that represents one or more applications that are installed on the second computer.

16. The method of claim 13, wherein the user cleaning module comprises one or more cleaning rules, wherein the cleaning rule set comprises one or more cleaning rule identities, wherein each cleaning rule identity of the one or more cleaning rule identities corresponds to a unique cleaning rule, and wherein a cleaning rule comprises a set of one or more parameters for cleaning at least one of one or more files and a registry of the second computer.

17. The method of claim 16, wherein each cleaning rule identity of the one or more cleaning rule identities corresponds to either a system cleaning rule, an application cleaning rule, or a registry cleaning rule.

18. The method of claim 13, further comprising creating a user interface and displaying the user interface at a screen of the computer, wherein the user interface comprises one of a web service and an application programming interface.

19. The method of claim 13, further comprising transmitting, by the administrator cleaning module, an instruction to clean one or more databases of the second computer over the network to the user cleaning module, wherein the instruction to clean one or more databases is based on the cleaning rule set.

20. The method of claim 13, further comprising transmitting, by the administrator cleaning module, an instruction to optimize one or more browser applications of the second computer over the network to the user cleaning module, wherein the instruction to optimize one or more browser applications is based on the cleaning rule set.

21. An apparatus, comprising:

a memory configured to store an administrator cleaning module; and a processor configured to execute the administrator cleaning module stored on the memory, wherein the processor is further configured, when executing the administrator cleaning module stored on the memory, to, establish a secure connection over a network with a user cleaning module executed on a computer, the computer being associated with a network summary, and the network summary comprising a number of computers in the network and a number of user cleaning module licenses;

receive application information over the network from the user cleaning module;

transmit a cleaning rule set over the network to the user cleaning module, wherein the cleaning rule set is based on the application information; and transmit an instruction to clean at least one of one or more files or a registry of the computer over the network to the user cleaning module, wherein the instruction is based on the cleaning rule set.

22. The apparatus of claim 21, wherein the processor is further configured, when executing the administrator cleaning module stored on the memory, to generate a main encryption key used to encrypt communications over the secure connection, and wherein the secure connection comprises a user datagram protocol.

23. The apparatus of claim 21, wherein the application information comprises an application list that represents one or more applications that are installed on the computer.

24. The apparatus of claim 21,
wherein the user cleaning module comprises one or more cleaning rules,
wherein the cleaning rule set comprises one or more cleaning rule identities,
wherein each cleaning rule identity of the one or more cleaning rule identities corresponds to a unique cleaning rule, and
wherein a cleaning rule comprises a set of one or more parameters for cleaning at least one of one or more files and a registry of the computer.

25. The apparatus of claim 24, wherein each cleaning rule identity of the one or more cleaning rule identities corresponds to either a system cleaning rule, an application cleaning rule, or a registry cleaning rule.

26. A computer-readable medium having a computer program stored thereon that, when executed by a processor, causes the processor to implement a method, the method comprising:
establishing a secure connection over a network with a user cleaning module executed on a computer, the computer being associated with a network summary, and the network summary comprising a number of computers in the network and a number of user cleaning module licenses;
receiving application information over the network from the user cleaning module;
transmitting a cleaning rule set over the network to the user cleaning module, wherein the cleaning rule set is based on the application information; and
transmitting an instruction to clean at least one of one or more files or a registry of the computer over the network to the user cleaning module, wherein the instruction is based on the cleaning rule set.

27. A method, comprising:
establishing, by a user cleaning module executed on a first computer, a secure connection over a network with an administrator cleaning module executed on a second computer, the second computer being associated with a network summary, and the network summary comprising a number of computers in the network and a number of user cleaning module licenses;
transmitting, by the user cleaning module, application information over the network to the administrator cleaning module;
receiving, by the user cleaning module, a cleaning rule set over the network from the administrator cleaning module, wherein the cleaning rule set is based on the application information; and
cleaning, by the user cleaning module, at least one of one or more files or a registry of the first computer, wherein the cleaning is based on an instruction and the cleaning rule set received from the administrator cleaning module.

28. The method of claim 27, wherein the establishing the secure connection over the network further comprises generating a main encryption key used to encrypt communications over the secure connection, and wherein the secure connection comprises a user datagram protocol.

29. The method of claim 27, wherein the application information comprises an application list that represents one or more applications that are installed on the first computer.

30. The method of claim 27,
wherein the user cleaning module comprises one or more cleaning rules,
wherein the cleaning rule set comprises one or more cleaning rule identities,
wherein each cleaning rule identity of the one or more cleaning rule identities corresponds to a unique cleaning rule, and
wherein a cleaning rule comprises a set of one or more parameters for cleaning at least one of one or more files and a registry of the first computer.

31. The method of claim 30, wherein each cleaning rule identity of the one or more cleaning rule identities corresponds to either a system cleaning rule, an application cleaning rule, or a registry cleaning rule.

32. The method of claim 30, wherein the cleaning at least one of one or more files and a registry of the first computer further comprises, for each cleaning rule that corresponds to each cleaning rule identity of the one or more cleaning rule identities of the cleaning rule set, at least one of the following: removing one or more files from the first computer, removing data from one or more files, removing one or more registry entries from the first computer, and removing data from one or more registry entries, based on the cleaning rule.

33. The method of claim 27, further comprising cleaning, by the user cleaning module, one or more databases of the first computer, wherein the cleaning is based on an instruction to clean one or more databases and the cleaning rule set received from the administrator cleaning module.

34. The method of claim 27, further comprising optimizing, by the user cleaning module, one or more browser applications of the first computer, wherein the optimizing is based on an instruction to optimize one or more browser applications and the cleaning rule set received from the administrator cleaning module.

35. An apparatus, comprising:
a memory configured to store a user cleaning module; and
a processor configured to execute the user cleaning module stored on the memory,
wherein the processor is further configured, when executing the user cleaning module stored on the memory, to,
establish a secure connection over a network with an administrator cleaning module executed on a computer, the computer being associated with a network summary, and the network summary comprising a number of computers in the network and a number of user cleaning module licenses;
transmit application information over the network to the administrator cleaning module;
receive a cleaning rule set over the network from the administrator cleaning module, wherein the cleaning rule set is based on the application information; and
clean at least one of one or more files or a registry of the apparatus based on an instruction and the cleaning rule set received from the administrator cleaning module.

36. The apparatus of claim 35, wherein the processor is further configured, when executing the user cleaning module stored on the memory, to generate a main encryption key used to encrypt communications over the secure connection, and wherein the secure connection comprises a user datagram protocol.

37. The apparatus of claim 35, wherein the application information comprises an application list that represents one or more applications that are installed on the apparatus.

38. The apparatus of claim 35,
wherein the user cleaning module comprises one or more cleaning rules,
wherein the cleaning rule set comprises one or more cleaning rule identities, wherein each cleaning rule identity of the one or more cleaning rule identities corresponds to a unique cleaning rule, and wherein a cleaning rule comprises a set of one or more parameters for cleaning at least one of one or more files and a registry of the apparatus.

39. The apparatus of claim 38, wherein each cleaning rule identity of the one or more cleaning rule identities corresponds to either a system cleaning rule, an application cleaning rule, or a registry cleaning rule.

40. The apparatus of claim 38, wherein the processor is further configured, when executing the user cleaning module stored on the memory, to, for each cleaning rule that corresponds to each cleaning rule identity of the one or more cleaning rule identities of the cleaning rule set, at least one of the following: removing one or more files from the apparatus, removing data from one or more files, removing one or more registry entries from the apparatus, and removing data from one or more registry entries, based on the cleaning rule.

41. A computer-readable medium having a computer program stored thereon that, when executed by a processor, causes the processor to implement a method, the method comprising:

establishing a secure connection over a network with an administrator cleaning module executed on a computer, the computer being associated with a network summary, and the network summary comprising a number of computers in the network and a number of user cleaning module licenses;

transmitting application information over the network to the administrator cleaning module;

receiving a cleaning rule set over the network from the administrator cleaning module, wherein the cleaning rule set is based on the application information; and cleaning at least one of one or more files or a registry, wherein the cleaning is based on an instruction and the cleaning rule set received from the administrator cleaning module.

* * * * *